(12) United States Patent
Addepalli

(10) Patent No.: US 11,544,525 B2
(45) Date of Patent: Jan. 3, 2023

(54) SYSTEMS AND METHODS FOR ARTIFICIAL INTELLIGENCE WITH A FLEXIBLE HARDWARE PROCESSING FRAMEWORK

(71) Applicant: Sateesh Kumar Addepalli, San Jose, CA (US)

(72) Inventor: Sateesh Kumar Addepalli, San Jose, CA (US)

(\*) Notice: Subject to any disclaimer, the term of this patent is extended or adjusted under 35 U.S.C. 154(b) by 696 days.

(21) Appl. No.: 16/528,548

(22) Filed: Jul. 31, 2019

(65) Prior Publication Data
US 2020/0250510 A1    Aug. 6, 2020

Related U.S. Application Data

(60) Provisional application No. 62/801,048, filed on Feb. 4, 2019.

(51) Int. Cl.
| | |
|---|---|
| *G06N 5/04* | (2006.01) |
| *G06N 3/04* | (2006.01) |
| *G06F 9/38* | (2018.01) |
| *G06F 9/455* | (2018.01) |
| *G06F 9/50* | (2006.01) |
| *G06N 3/08* | (2006.01) |

(52) U.S. Cl.
CPC ............ *G06N 3/0418* (2013.01); *G06F 9/382* (2013.01); *G06F 9/45558* (2013.01); *G06F 9/5011* (2013.01); *G06N 3/084* (2013.01); *G06N 5/04* (2013.01)

(58) Field of Classification Search
CPC ..................................................... G06N 3/084
USPC ........................................................ 706/25
See application file for complete search history.

(56) References Cited

U.S. PATENT DOCUMENTS

| | | |
|---|---|---|
| 5,487,153 A | 1/1996 | Hammerstrom et al. |
| 8,521,664 B1 | 8/2013 | Lin et al. |
| 9,285,783 B2 | 3/2016 | Craig et al. |
| 2008/0137550 A1 | 6/2008 | Jurca et al. |
| 2008/0235162 A1 | 9/2008 | Spring |

(Continued)

FOREIGN PATENT DOCUMENTS

| | | |
|---|---|---|
| CN | 102893233 B | 1/2016 |
| WO | 2011050482 A1 | 5/2011 |

(Continued)

OTHER PUBLICATIONS

Li et al ("A Fully Pipelined Hardware Architecture for Convolutional Neural Network with Low Memory Usage and DRAM Bandwidth" 2017) (Year: 2017).*

(Continued)

*Primary Examiner* — Lut Wong
(74) *Attorney, Agent, or Firm* — Steven A. Nielsen; www.NielsenPatents.com

(57) ABSTRACT

An artificial intelligence (AI) system is disclosed. The AI system provides an AI system lane processing chain, at least one AI processing block, a local memory, a hardware sequencer, and a lane composer. Each of the at least one AI processing block, the local memory coupled to the AI system lane processing chain, the hardware sequencer coupled to the AI system lane processing chain, and the lane composer is coupled to the AI system lane processing chain. The AI system lane processing chain is dynamically created by the lane composer.

18 Claims, 22 Drawing Sheets

(56) References Cited

U.S. PATENT DOCUMENTS

| | | | |
|---|---|---|---|
| 2010/0185566 A1 | 7/2010 | Schott et al. | |
| 2010/0285082 A1 | 11/2010 | Fernandez | |
| 2012/0101652 A1 | 4/2012 | Shin et al. | |
| 2012/0150361 A1 | 6/2012 | Lazaris | |
| 2012/0311488 A1 | 12/2012 | Mouton et al. | |
| 2013/0111487 A1 | 5/2013 | Cheyer et al. | |
| 2013/0262349 A1 | 10/2013 | Bouchra et al. | |
| 2015/0235308 A1 | 8/2015 | Mick et al. | |
| 2016/0239074 A1 | 8/2016 | Lee et al. | |
| 2017/0005515 A1 | 1/2017 | Sanders et al. | |
| 2017/0103314 A1 | 4/2017 | Ross | |
| 2017/0123419 A1 | 5/2017 | Levinson et al. | |
| 2017/0193361 A1* | 7/2017 | Chilimbi | G06N 3/084 |
| 2017/0213128 A1 | 7/2017 | Hammond et al. | |
| 2017/0213131 A1 | 7/2017 | Hammond et al. | |
| 2017/0236053 A1* | 8/2017 | Lavigueur | G06N 3/063 |
| | | | 706/31 |
| 2017/0308800 A1 | 10/2017 | Cichon et al. | |
| 2017/0318008 A1 | 11/2017 | Mead | |
| 2017/0323197 A1 | 11/2017 | Gibson et al. | |
| 2018/0129952 A1 | 5/2018 | Saxena et al. | |
| 2018/0293463 A1* | 10/2018 | Brown | G06Q 10/00 |
| 2018/0322390 A1 | 11/2018 | Das et al. | |

FOREIGN PATENT DOCUMENTS

| | | |
|---|---|---|
| WO | 2017132590 A1 | 8/2017 |
| WO | 2018184208 A1 | 10/2018 |
| WO | 2018218259 A1 | 11/2018 |
| WO | 2019010065 A1 | 1/2019 |
| WO | 2020163303 A1 | 8/2020 |
| WO | 2020163308 A1 | 8/2020 |
| WO | 2020163315 A1 | 8/2020 |
| WO | 2020163320 A1 | 8/2020 |
| WO | 2020163327 A1 | 8/2020 |
| WO | 2020163333 A1 | 8/2020 |
| WO | 2020168100 A1 | 8/2020 |
| WO | 2020172045 A1 | 8/2020 |

OTHER PUBLICATIONS

Venieris et al ("Toolflows for Mapping Convolutional Neural Networks on FPGAs: A Survey and Future Directions" 2018) (Year: 2018).*
International Search Report and Written Opinion for International PCT Application No. PCT/US2020/016583, dated May 21, 2020.
International Search Report and Written Opinion for International PCT Application No. PCT/US2020/016545, dated Jun. 4, 2020.
International Search Report and Written Opinion for International PCT Application No. PCT/US2020/016565, dated Jun. 4, 2020.
International Search Report and Written Opinion for International PCT Application No. PCT/US2020/016553, dated May 28, 2020.
Wagh et al., Efficient and Private Neural Network Training [online] May 14, 2018 [retrieved May 29, 2020] from https://eprint.iacr.org/2018/442/20180514:150605; Abstract.
International Search Report and Written Opinion for International PCT Application No. PCT/US2020/016560, dated Apr. 30, 2020.
International Search Report and Written Opinion for International PCT Application No. PCT/US2020/016574, dated Apr. 30, 2020.
International Search Report and Written Opinion for International PCT Application No. PCT/US2020/018142, dated May 28, 2020.
International Search Report and Written Opinion for International PCT Application No. PCT/US2020/018150, dated May 21, 2020.

* cited by examiner

SYSTEMS AND METHODS FOR ARTIFICIAL INTELLIGENCE WITH A FLEXIBLE HARDWARE PROCESSING FRAMEWORK

CROSS REFERENCE TO RELATED APPLICATIONS

This application claims priority to U.S. Provisional Application No. 62/801,048, filed Feb. 4, 2019, and titled "SYSTEMS AND METHODS FOR ARTIFICIAL INTELLIGENCE WITH A FLEXIBLE HARDWARE PROCESSING FRAMEWORK," the disclosures of which are hereby incorporated herein in its entirety and for all purposes.

TECHNICAL FIELD

The subject matter disclosed herein generally relates to artificial intelligence (AI). More specifically, the present disclosures relate to systems and methods for AI with a flexible hardware processing framework.

BACKGROUND

Conventional virtualized artificial intelligence (AI) frameworks rely on AI software processing frameworks for executing AI solution models (training and inference). The AI solution model may be an output of an AI system that solves a problem or a request made by a user. For example, an AI solution model may be the output by the AI system based on the user having requested of the AI system to generate a model that, when performed by the AI system, organizes images into various categories after being trained on a set of training data. Conventionally, AI software processing frameworks employ virtual machine (VM) operating systems (OS) or application environment is installed on software, which imitates dedicated hardware. The end user has the same experience on a virtual machine as they would have on dedicated hardware. The VM and OS are provided in the execution (training and inference) path of the AI solution model.

BRIEF DESCRIPTION OF THE DRAWINGS

Various aspects embodiments are illustrated by way of example and not limitation in the figures of the accompanying drawings.

DETAILED DESCRIPTION

Figure 1:
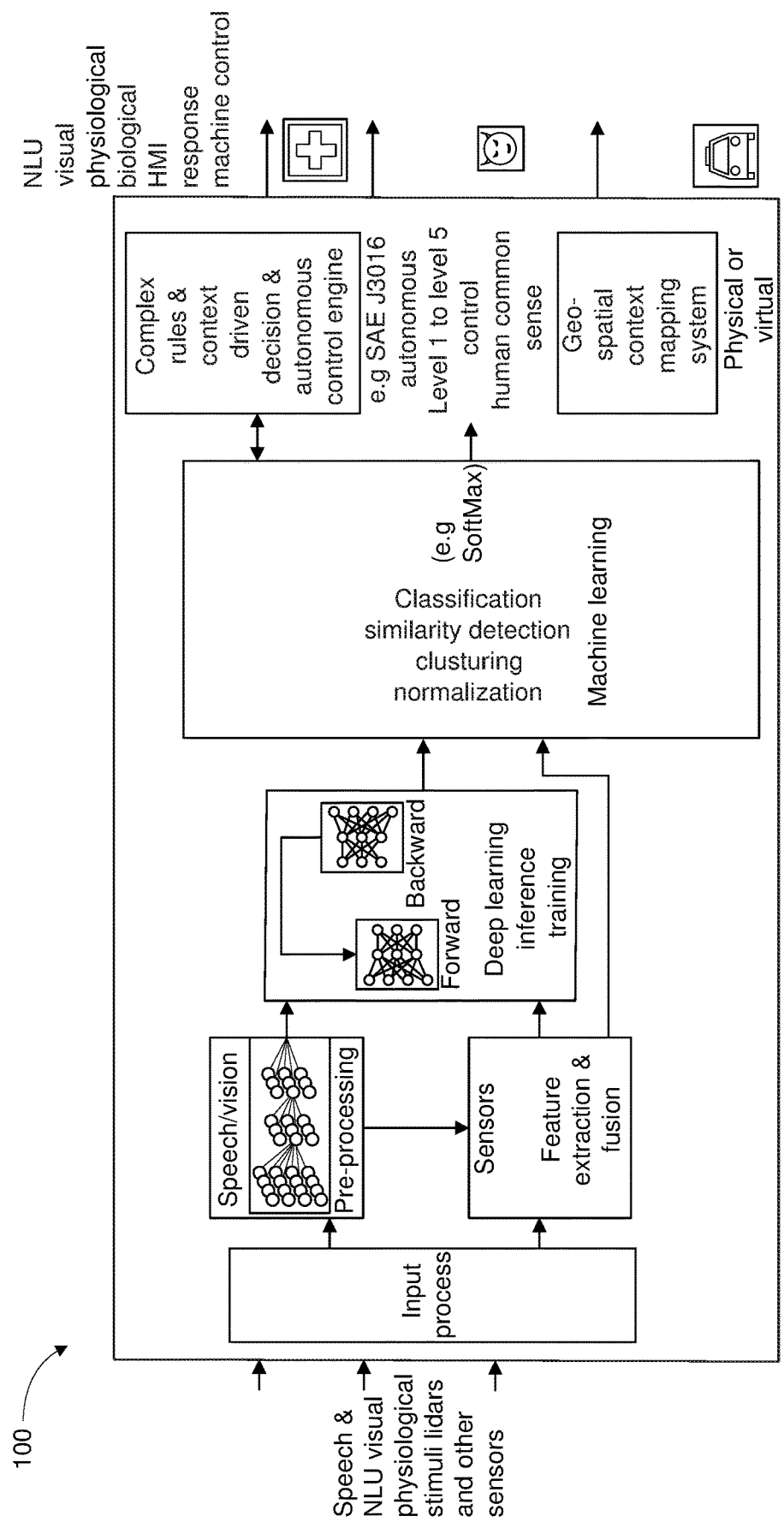
FIG. 1 is a diagram of an example manifestation of an AI system for smart connected, advanced driver assistance systems (ADAS) and autonomous vehicles (AV), in accordance with at least one aspect of the present disclosure.

Applicant of the present application owns the following U.S. Provisional Patent Applications, all filed on Feb. 4, 2019, the disclosure of each of which is herein incorporated by reference in its entirety:

U.S. Provisional Application No. 62/801,044, titled SYSTEMS AND METHODS OF SECURITY FOR TRUSTED AI HARDWARE PROCESSING;

U.S. Provisional Application No. 62/801,046, titled SYSTEMS AND METHODS FOR ARTIFICIAL INTELLIGENCE HARDWARE PROCESSING;

U.S. Provisional Application No. 62/801,049, titled SYSTEMS AND METHODS FOR CONTINUOUS AND REAL-TIME AI ADAPTIVE SENSE LEARNING;

U.S. Provisional Application No. 62/801,050, titled LIGHTWEIGHT, HIGH SPEED AND ENERGY EFFICIENT ASYNCHRONOUS AND FILE SYSTEM-BASED ARTIFICIAL INTELLIGENCE PROCESSING INTERFACE FRAMEWORK; and U.S. Provisional Application No. 62/801,051, titled SYSTEMS AND METHODS FOR POWER MANAGEMENT OF HARDWARE UTILIZING VIRTUAL MULTILANE ARCHITECTURE.

Applicant of the present application also owns the following U.S. Non-Provisional Patent Applications, filed herewith, the disclosure of each of which is herein incorporated by reference in its entirety:

Applicant of the present application also owns the following U.S. Non-Provisional Patent Applications, filed herewith, the disclosure of each of which is herein incorporated by reference in its entirety:

Application Ser. No. 16/528,545, titled SYSTEMS AND METHODS OF SECURITY FOR TRUSTED ai HARDWARE PROCESSING, Application Ser. No. 16/528,543, titled SYSTEMS AND METHODS FOR ARTIFICIAL INTELLIGENCE HARDWARE PROCESSING, Application Ser. No. 16/528,549, titled SYSTEMS AND METHODS FOR CONTINUOUS AND REAL-TIME AI ADAPTIVE SENSE LEARNING, Application Ser. No. 16/528,551, titled LIGHTWEIGHT, HIGH SPEED AND ENERGY EFFICIENT ASYNCHRONOUS AND FILE SYSTEM-BASED AI PROCESSING INTERFACE FRAMEWORK, and Application Ser. No. 16/528,553, titled SYSTEMS AND METHODS FOR POWER MANAGEMENT OF HARDWARE UTILIZING VIRTUAL MULTILANE ARCHITECTURE.

Aspects of the present disclosure provide a virtualized AI system comprising a multilane parallel hardware secure multi-functional AI application solution compute engine without the need for an AI software processing framework. In one aspect, the AI system is configured to execute an AI solution model (training and inference) using a secure AI solution hardware processing virtualized AI system multilane hardware AI framework concept without a compute unified device architecture (CUDA) or Tensorflow or any such AI software framework. In one aspect, the AI system is implemented in and does not include a VM and OS in the execution (training and inference) path of the AI solution model, with built-in trust and security, continuous input from diverse sources such as Lidar sensors, vision sensors, and speech sensors, among other sensors, etc., and with real-time decision output.

In another aspect, the present disclosure provides a virtualized AI system. The virtualized AI system is configured to execute multiple AI solutions/models in parallel using multiple virtual AI system parallel lanes.

In another aspect, the present disclosure provides a virtualized AI system is configured to create, destroy and maintain the AI system lane and virtual AI system multilane using an AI system lane composer and virtual lane maintainer, respectively. The AI system is configured to create or destroy AI processing chain by allocating one or more processing elements. For example, a forward propagation chain as well as a backward propagation chain can be created dynamically to execute AI solution model inference and AI solution model training. The AI system is configured to create or destroy one or more AI system lane hardware units based on AI solution/model size and execution speed to create a virtual AI system multilane.

In another aspect, the present disclosure provides an AI system lane composer and virtual lane maintainer. The AI system lane composer and virtual lane maintainer are configured to enable dynamic updates, destruction of lanes, virtual lane hardware framework modules through dynamic expansion or contraction of an AI processing chain and parametrization thereof, including functional, performance, model attributes (neural type, network layers, layer depth, etc.).

In another aspect, the present disclosure provides a novel AI processing hardware orchestrator (hierarchy of these instances along with an uber instance) to dynamically trigger an AI system lane composer and a virtual AI system lane maintainer to enable and trigger a hardware execution sequencer that in turn executes the AI processing chain of the AI system lanes in a real-time and continuous manner.

In one aspect, the present disclosure provides a virtualized AI system multilane parallel hardware AI processor. The AI processor incorporates first and second parallel processing AI system lanes configured to ingest one or more AI neural model(s) where the first AI system lane takes in a first full or partial model, and the second AI system lane takes in a second full or partial model until all pushed models are accommodated to meet a given functional, performance and power criteria. An AI neural model can be already trained model(s) or model(s) yet to be trained. In one aspect, the virtual AI system multilanes are created, destroyed and maintained using a virtual lane maintainer. The virtualized AI system multilane parallel hardware AI processor provides a security centric AI application solution hardware compute engine.

In one aspect, the present disclosure provides an apparatus, wherein each parallel processing AI system lane comprises a set of elements such as foundational AI processors, AI neural model ingestors, input inference/training data ingestors, configurable inference algorithms, configurable training algorithms, and so on. In one aspect, execution within the AI system lane may be accomplished by creating an AI processing chain using an AI system lane composer in order to dynamically access above elements in a pipelined and parallelized manner without the need for an AI software framework running a traditional central processing unit (CPU). In one aspect, forward or backward propagation chains, or combinations thereof, may be can be created while training a model.

In another aspect, the present disclosure provides a method for an AI processing hardware orchestrator, wherein the method drives the setting and execution of real-time and continuous running AI solutions on virtual AI system multilanes to completion. It eliminates multi processors/CPU, VMs, OS and graphics processing unit (GPU) based full stack software AI frameworks intervention such that inference and training is self-contained and real-time continuous without any interruption or overhead associated with traditional AI accelerators working in conjunction with full stack software AI frameworks.

In one aspect, according to the present disclosure, one or more AI hardware processing lanes may be employed to create a virtualized AI framework to execute an AI solution or an AI solution model. This can be achieved without the need for multiple processors, SW hypervisor, guest OS, VM memory, caching, AI software framework, GPU driver, GPU schedulers, GPU stream channels allocation, and the like, for example. Therefore, this implementation will not require a full stack, OS, or VM software overhead. In one aspect, the present disclosure provides an AI solution model processing hardware that can intake an AI solution model and the corresponding training/inference data directly into hardware without any full stack software overhead in the processing path. This provides a complete AI solution model processing engine rather than a conventional accelerator assisting the AI software (SW) framework running on a CPU.

Conventional AI solution model processing split across an AI SW framework running on multiple VMs with multi processors and GPUs requires extensive hardware, such as a peripheral component interconnect (PCI) path to/from a CPU, in instances where an AI framework is running and a GPU and software thread overhead, data copy, and duplication transfer overhead at every stage of full stack processing including at the CPU as well as the GPU at every iteration of AI solution model training. In accordance with the present disclosure, this type of processing overhead does not exist because there is no software stack driven AI solution model processing engine and does not incur any software and processor overhead along the processing path during the model training stage.

In one aspect, according to the present disclosure, a virtualized AI system multilane parallel hardware secure multi-functional AI application solution compute engine enables a complete high speed, real-time, continuous, secure AI solution without the need for an external CPU or GPU for a range of inputs and a range of decision outputs.

FIG. 1 is a diagram 100 of an example manifestation of an AI system for smart connected, advanced driver assistance systems (ADAS) and autonomous vehicles (AV), in accordance with at least one aspect of the present disclosure. The diagram 100 shown in FIG. 1 describes a solution that can be realized by the AI system framework according to the present disclosure. The AI system takes the input from sensors such as a lidar, camera, microphone, standard interfaces (e.g., peripheral component interconnect express [PCIE], Ethernet, wireless, serial, high-definition multimedia interface (HDMI), among others, for example). The input processes feeds the inputs to pre-processing and feature extraction components that can be fed as inputs to an AI system lane where different AI system operations such as deep learning inference, training and machine learning is performed. As shown in FIG. 1, the input process includes a framework that supports the fusion of sensors from different inputs. Similarly, the input process supports decision outputs from various uses cases in real-time. Finally, in conjunction with a mapping system it can support an autonomous navigation system.

AI System Single Lane Framework

Figure 2:
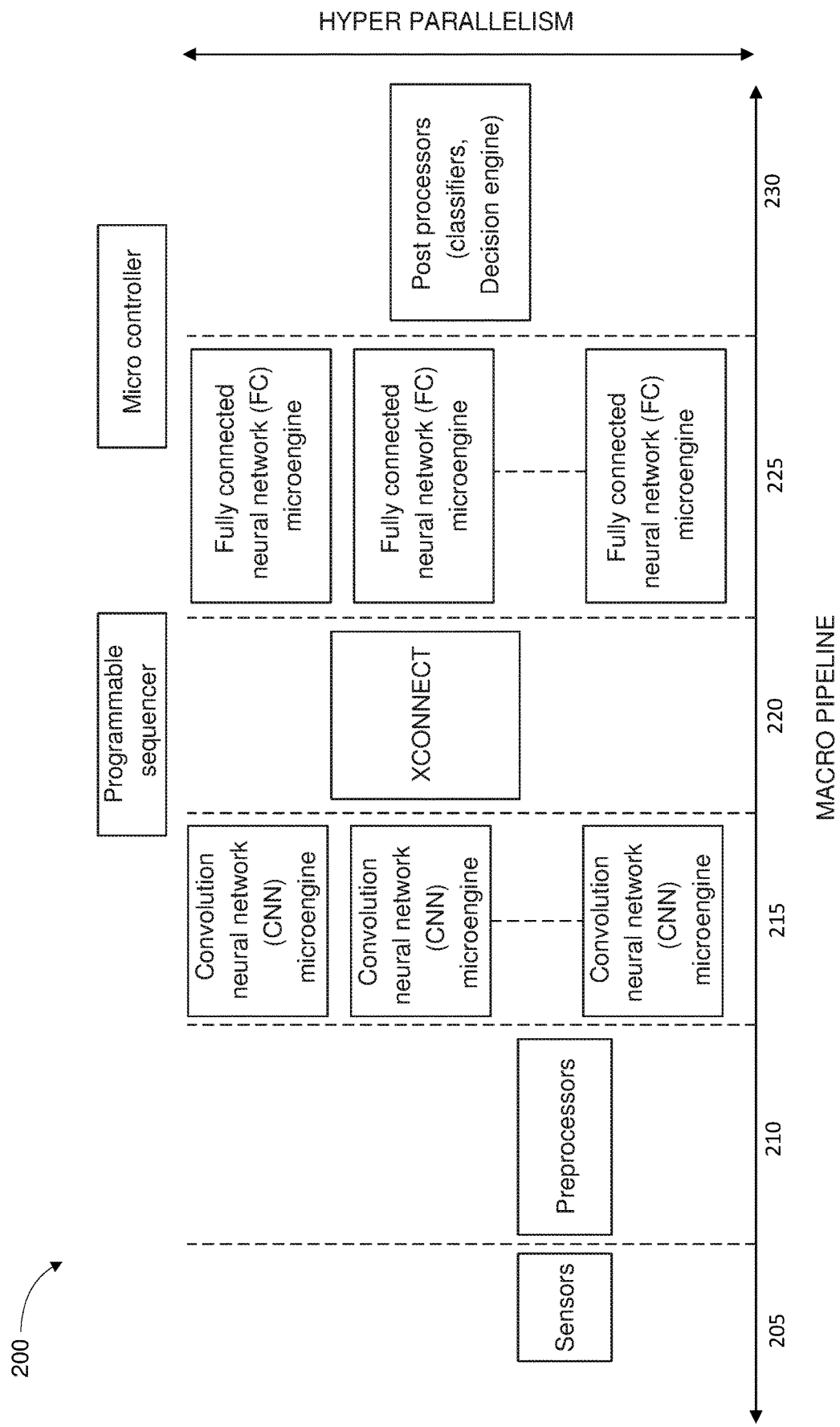
FIG. 2 is a diagram of a block level overview of an AI system single lane framework, in accordance with at least one aspect of the present disclosure.

FIG. 2 is a diagram 200 of a block level overview of an AI system single lane framework, in accordance with at least one aspect of the present disclosure. The AI system lane is a full-fledged processing unit configured to execute an entire AI application solution including inferencing and training an AI solution model. FIG. 2 depicts a security centric AI application solution hardware compute engine. It is not an accelerator. It does not require multiple multithreading processors/CPUs, SW hypervisor, guest OS, VM memory, caching, AI software framework, GPU driver, GPU schedulers, GPU stream channels allocation, among others, and does not require a full stack, OS, VM software overhead. The AI system single lane framework provides direct AI solution model processing hardware that can take in the model and corresponding training/inference data directly into hardware without any full stack software overhead in the processing path. The integration of these blocks in a single hardware structure and used in computation of each layer in serial pipeline is believed not to found elsewhere. The fundamental hardware construct of the AI system lane according to the present disclosure comprises a series of AI processing elements operating on a real-time continuous basis at clock speed with constant latency. Unlike a CPU+GPU/tensor processing unit (TPU) accelerator combination implementation, the present AI system lane does not require back and forth multi pass between CPU and GPU/TPU for forward or backward propagation during inference/training. That is, the classic learning approach is to collect the data, then train it using dozens of GPU/CPUs in combination. The produced output is used in inference. Hence, typically there no continuous training and inference running in low latency. In contrast, the approach of the AI System of the present disclosure by using inference AI PLUs and backpropagation AI PLUs provides for continuous training and inference. It is not believed there is another architecture that could do this right know.

At each stage, various components may run in parallel, while the stages are performed serially. In the macro pipeline, the process flow starts with receiving data from sensors, at stage 205. At stage 210, this data may be preprocessed to be receivable by various hardware components, like the ISN-MCUs and/or ADI-PLUs (see e.g., description below and U.S. Provisional Application No. 62/801,046, filed, Feb. 4, 2019, and titled, "SYSTEMS AND METHODS FOR ARTIFICIAL INTELLIGENCE HARDWARE PROCESSING," (Set 2). At stage 215, the preprocessed data may be further processed through one or more CNN micro engines, where the CNNs learn from the received data as well as provide inference about the data. At stage 220, a programmable sequencer may be used, such as an XConnect sequencer. At stage 225, the data then may be more thoroughly analyzed by the fully connected neural network micro engines. At stage 230, the data may then reach post processors, where it is fully analyzed by classifiers or a decision engine, for example.

Figure 3:
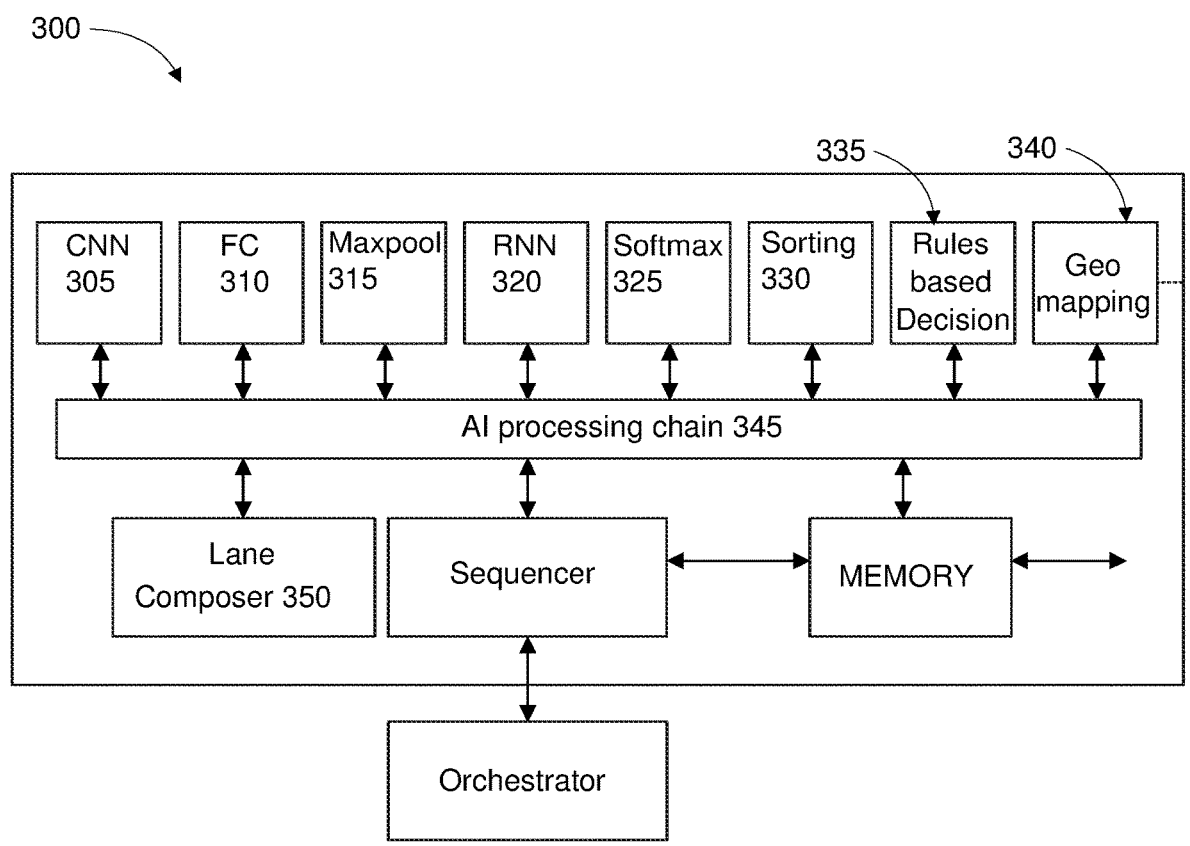
FIG. 3 is a diagram of a high level overview of an AI system lane, in accordance with at least one aspect of the present disclosure.

FIG. 3 is a diagram 300 of a high level overview of an AI system lane, in accordance with at least one aspect of the present disclosure. The AI system lane comprises multiple AI processing blocks such as, for example, an INPUT processing block, a convolutional neural network (CNN) 305, a fully connected (FC) neural network 310, a long short term memory (LSTM), a recurrent neural network (RNN) 320, a MaxPool 315, an AvgPool, a normalization, an activation, a SoftMax 325, a sorting module 330, a classification, a decision module, a sorting module 330, a rules based decision module 335, and/or a geo mapping foundational blocks/engines/elements 340, among other foundational blocks/engines/elements. The AI processing chain 345 is dynamically created using an AI system lane composer function 350. For example, a forward propagation chain can be dynamically created to execute an AI solution model inference. Similarly, a backward propagation chain can be added dynamically in order to execute a complete training of an AI solution model. These all may be governed by an orchestrator. A detailed description of an AI system lane is provided below with reference to FIGS. 4-6, in accordance with one aspect of the present disclosure.

Figure 4:
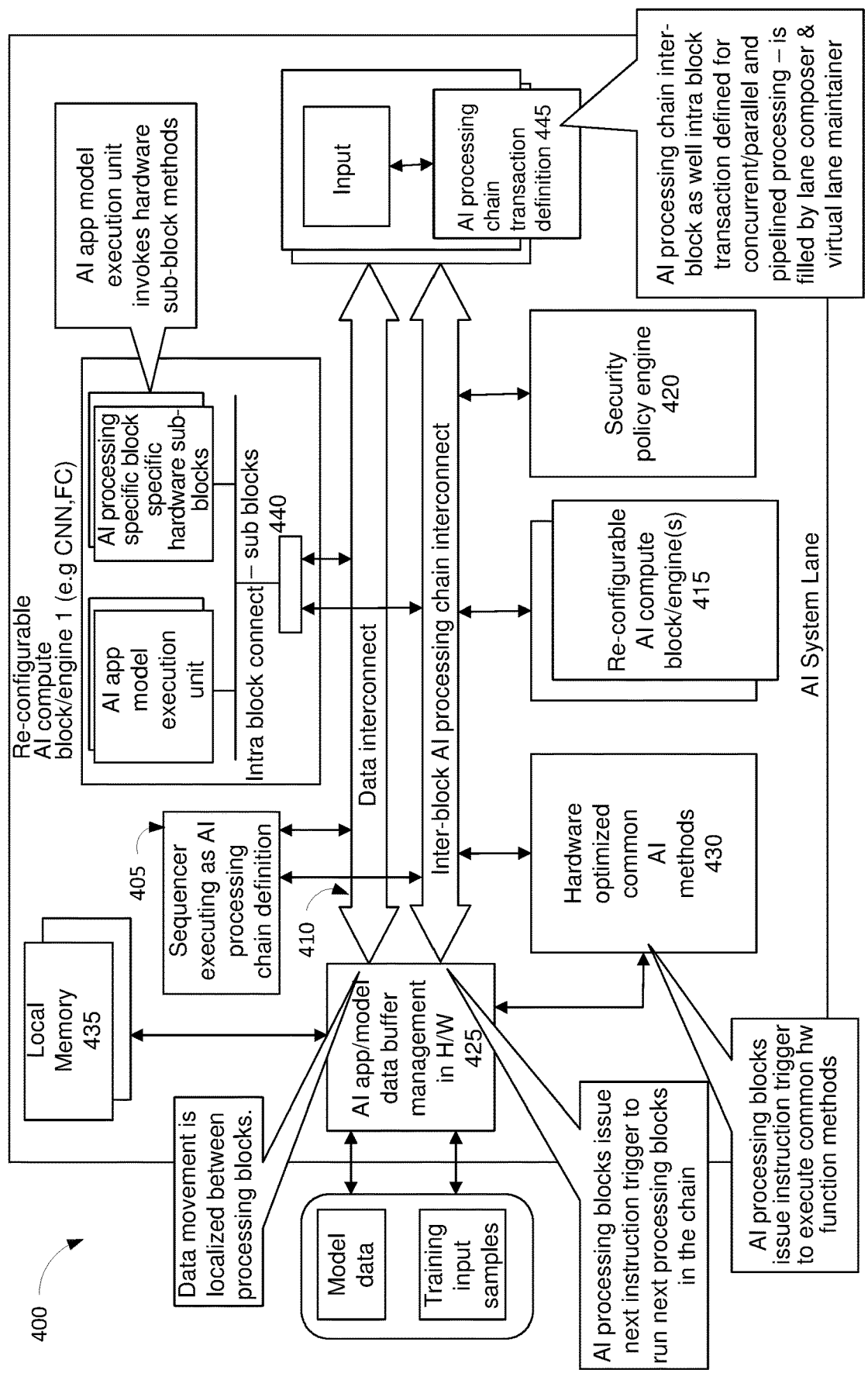
FIG. 4 is a diagram of an AI system lane comprising energy efficient hyper parallel and pipelined temporal and spatial scalable artificial intelligence (AI) hardware with minimized external memory access, in accordance with at least one aspect of the present disclosure.

FIG. 4 is a diagram 400 of an AI system lane comprising energy efficient hyper parallel and pipelined temporal and spatial scalable artificial intelligence (AI) hardware with minimized external memory access, in accordance with at least one aspect of the present disclosure. An AI system lane is an integrated secure AI processing hardware framework with an amalgamation of hyper-parallel-pipelined (HPP) AI compute engines interlinked by data interconnect busses with a hardware sequencer 405 to oversee AI compute chain execution. The execution flow is orchestrated by the sequencer 405 by using an AI processing chain flow. The blocks within the AI system lane are interconnected by high bandwidth links, e.g., data interconnects 410 and inter-block AI processing chain interconnects, to transfer the output between each other. Therefore, one or more AI compute engines can run in parallel/pipeline to process the AI algorithm.

In various aspects, an AI system lane comprises eight major blocks, such as re-configurable AI compute engine blocks 415, interconnects 410, a sequencer 405, common method processing blocks 430, local memory 435, security policy engine block 420, AI application data management buffer 425, intra block connect sub blocks 440, etc. All the modules work together to solve the task assigned to the AI system lane.

In one aspect, the AI system lane comprises re-configurable AI compute engines/blocks hardware 415. The re-configurable AI compute engines/blocks hardware is an AI system integrated high performance and highly efficient engine. The re-configurable AI compute engines/blocks hardware computes the AI methods assigned by the sequencer 405. The sequencer 405 is comprised of a state machine with one or more configurable AI-PLUs to process the AI application/model. The sequencer 405 maintains a configurable AI-PLU to compute different type of methods. Due to the configurable nature of the hardware, utilization is very high. Hence, a high throughput is achieved at a low clock frequency and the process is very energy efficient. In case of secure processing, it also contains one or more S-PLUs to process security related features and consequently provide iron clad security to the AI system lane as well as enabling a wide range of AI driven security applications. The re-configurable AI compute engine blocks 415 eliminate the need for an operating system and AI software framework during the processing of AI functions.

In one aspect, the AI system lane comprises local memory 435. The local memory 435 may be a high speed memory interfaced to the AI application data management hardware 425. It has the data, the layer results, weights, and inputs required by the AI system lane to execute.

In one aspect, the AI system lane comprises a common method processing block 430. The common method processing block 430 contains the hardware to process common functions. For example, encrypting the output, etc.

In one aspect, the AI system lane comprises an AI application data management buffer block 425. The AI application data management buffer block manages the memory requirement between the blocks. It also maintains the data transfer between the global memory and local memory.

In one aspect, the AI system lane comprises data and AI processing chain interconnects 410. All the blocks are connected by the data interconnect bus and an inter-block AI processing chain interconnect bus. The data interconnect bus transfers data within the engines and transfers to local memory. The inter-block AI processing chain interconnect bus carries all the control information. Control blocks include, for example, application buffer management H/W, sequencer, and instruction trigger modules. Data movement is localized within the blocks. The data interconnect bus has higher bandwidth when compared to the inter-block AI processing chain interconnect.

In one aspect, the AI system lane comprises a security policy engine 420. The security policy engine safeguards the AI system lanes from security attacks (virus/worms, intrusions, denial of service (DoS), theft). The security policy engine directs enforcement of all the security features required to make the execution of the model secure on the compute block/engine. Additional details of trust and security built into the AI system are found in commonly owned Application Attorney Docket No. Set 1/1403394.00002, U.S. Provisional Application No. 62/801,044, titled SYSTEMS AND METHODS OF SECURITY FOR TRUSTED AI HARDWARE PROCESSING, filed on Feb. 4, 2019, which is again incorporated herein by reference in its entirety.

In one aspect, the AI system lane comprises a sequencer 405. The sequencer directs AI chain execution flow as per the inter-block and intra-block transaction definition 445. An AI system lane composer and virtual lane maintainer provides the required definition. The sequencer 405 maintains a queue and a status table. The queue contains model identification (ID), type of methods and configuration data for the layer(s). The model ID differentiates the model being executed. The methods inform the sequencer the type of re-configurable AI compute engine blocks to use. Configuration data contains the macro parameters that are required by the engines to execute the model properly. The status table contains the status of all the AI processing blocks. The table maintenance is active whether the AI processing block is busy or idle. All the operations will be queued by the lane orchestrator in the sequencer 405. The sequencer will trigger the operation from the queue depending on the available AI-PLU block which is idle. Once an operation is completed by the AI-PLU block, the sequencer 405 will change the corresponding entry to idle in the status table and reports it to the lane orchestrator about the completion. The lane orchestrator will now ask the AI system lane for the transfer of the output if all the tasks related to the input with respect to the model are completed.

Figure 5:
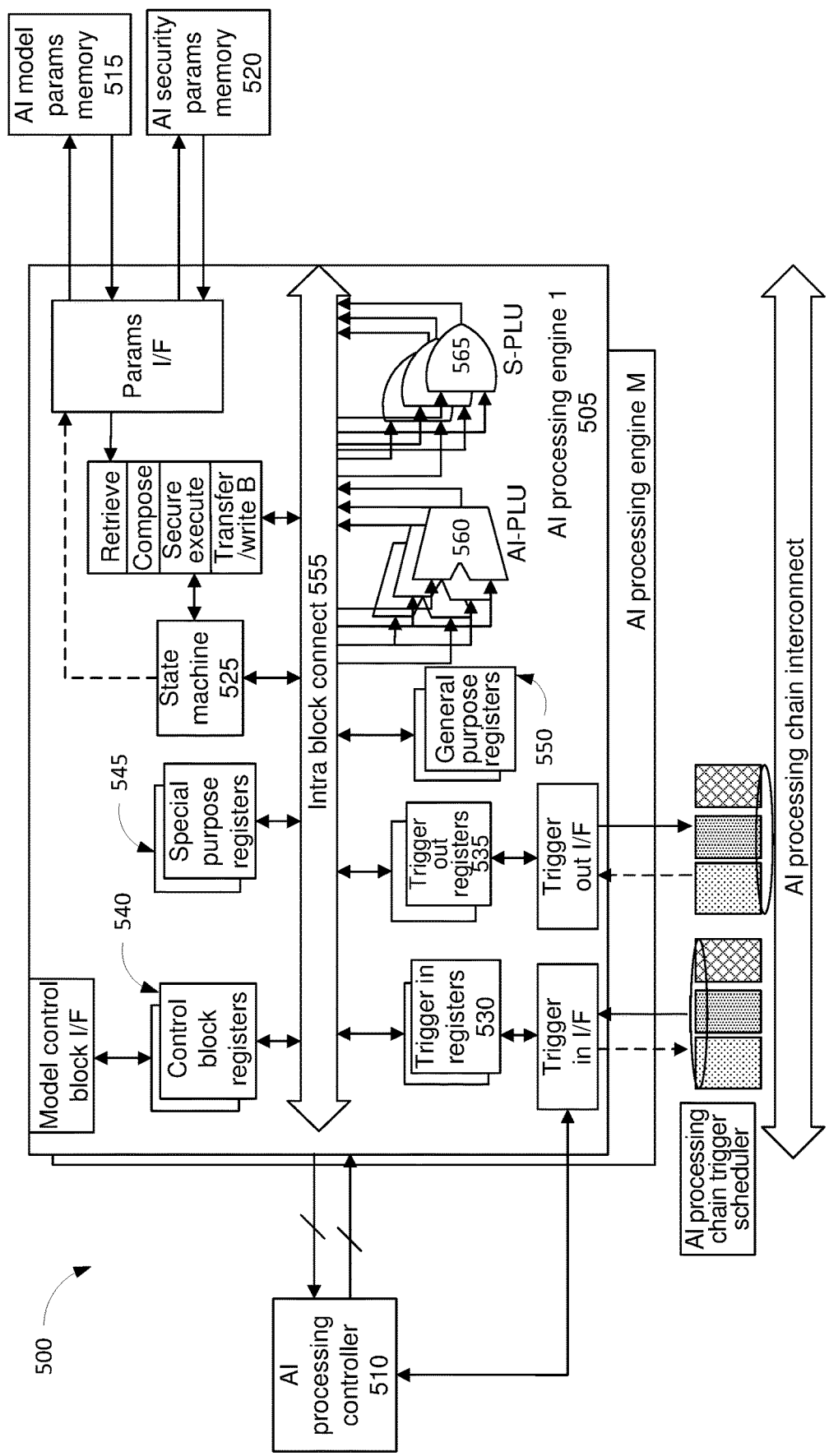
FIG. 5 is a diagram of a secure re-configurable AI compute engine block with no traditional software overhead during model execution (inference or training) for speed and efficiency, in accordance with at least one aspect of the present disclosure.

FIG. 5 is a diagram 500 of a secure re-configurable AI compute engine block 415 (see e.g., FIG. 4) with no traditional software overhead during model execution (inference or training) for speed and efficiency, in accordance with at least one aspect of the present disclosure. As used herein, the secure re-configurable AI compute engine block 415 comprises at least one AI processing engine 505 (shown here are multiple engines 1 through M), an AI processing controller 510 coupled to the processing engine(s) 505, an AI solution model parameters memory 515 coupled to the processing engine(s) 505, and an AI security parameters memory 520 coupled to the processing engine(s) 505. The processing engine comprises a state machine 525, trigger in/out registers 530 and 535, a control register 540, a special purpose register 545, a general purpose register 550, and an intra block connect bus 555 for communication and control between the registers 530, 535, 545, 550, control blocks 540, and state machine 525. The processing engine also comprises AI processing logic units (AI-PLUs) 560 and security processing logic unit (S-PLUs) 565 coupled to the intra block connect bus 555.

In one aspect, the AI compute engine block 415 comprises a plurality of processing engines 505 configured to trigger the state machine 525 for different memory and control transactions. The AI compute engine block 415 manages the chain of triggers required to complete a subsequent layer and also manages the memory transaction triggers. Control transaction includes triggering the state machine 525 corresponding to the method, software resetting the processing engine, etc. The compute engine block 415 also manages the memory triggers triggered by the state machine 525 such as write or read. The memory master, which resides outside of the AI compute engine block 415, will trigger the state machine 525 once the memory transaction triggered by the state machine 525 is completed. So all the combination of AI method trigger, memory transaction trigger, and software reset is managed by the trigger in/out registers 530 and 535.

In one aspect, the AI compute engine block processing engine(s) 505 comprises AI processing logic units (AI-PLUs) 560. Each of the AI-PLUs contains a set of multiplier, comparators and adders functional units. This fabric of functional units can be configured by the AI parameters to process AI methods such as CNN forward/backward, fully connected (FC) forward/backward, max-pooling, un-pooling, etc. This configuration is dependent on the dimensions of the model, type of the AI method and memory width (number of vector inputs that can be fetched at a single clock). The AI-PLU(s) 560 can process wide vectors at a single clock in a pipelined configuration. Hence it has high performance and is energy efficient.

In one aspect, the AI compute engine block processing engine(s) 505 comprises security processing logic units (S-PLUs) 565. Each of the S-PLUs contains a set of cryptographic primitives such as hash functions, encrypt/decrypt blocks, arranged in parallel and pipelined configuration to implement various security/trust functions. This fabric of functional units can be configured with the security parameters to process certain security features. These configurations are directed by the security policy engine. It can process wide security processing vectors at a single clock in a pipelined configuration. Hence, it has high performance and is energy efficient. In addition to protecting the AI application/solution models, S-PLUs in conjunction with AI-PLUs and other security and trust features built on to the AI system can run AI driven security applications for a range of use cases and markets.

In one aspect, the AI compute engine block processing engine(s) 505 comprises a state machine 525. The state machine 525 is the brain of the AI compute engine block. The state machine 525 takes control input and does the required task to complete the computation. The state machine 525 contains four major states: retrieve, compose, execute, and transfer/write back state. The behavior of the state machine 525 can be configured using the parameter set by the configure module namely, security parameters, AI application model parameters, etc. The state machine 525 can run inference or back propagation depending on type of flow chosen. It engages extra PLU's for weight update and delta calculation. In various states, the state machine 525 interfaces with the AI solution model parameters memory and the AI security parameters memory via a parameters interface (I/F).

The retrieve state retrieves the input from the local memory of the AI system lane as described with reference to FIG. 4. Returning now to FIG. 5, the retrieve state also may retrieve the partial output from the previous iteration depending on the data dependency of the computation. If security is enabled, the retrieve state also retrieves security related parameters and credentials.

The compose state composes the input to the AI-PLUs of the AI compute engine 415. This depends on the input length, number of parallel hardware present PLU of the engine and also aligns the inputs in the order in which the parallel hardware in the PLU will process the data.

Once the data is composed, the execute state provides the execute signal to one or more sub-blocks/PLUs (S-PLUs and AI-PLUs) to process the input data.

The transfer/write back state writes back the partial results from the PLUs output to a general purpose register or transfers the final output from the PLUs to the local memory.

In one aspect, the AI compute engine block processing engine 505 comprises a general purpose register 550. The general purpose register 550 stores temporary results. The general purpose register 550 is used to store the partial sum coming from the AI-PLU output. These registers are filled by the write back state of the state machine 525.

In one aspect, the AI compute engine block processing engine comprises a control block register 540. The control block register 540 contains the different model parameters required to control the state machine 525. The control block registers 540 are a set of parameters computed on the fly which is used by the state machine 525 to accommodate the input AI solution model with variable size into the specific width parallel hardware present in the AI-PLU hardware. Control registers are used by the state machine 525 to control execution of each state correctly. The control block registers interface with the AI system lane described with reference to FIG. 4 via a model control interface (I/F).

Returning now to FIG. 5, in one aspect, the AI compute engine block processing engine comprises special purpose registers 545. Special purpose registers 545 are wide bus registers used to perform special operations on a data vector at once. The special purpose register 545 may perform the bit manipulation of the input data vector to speed up the alignment of the vector required by the PLU to process the data. The special purpose register 545 may perform shifting/AND/OR/masking/security operations on the large vector of data at once. These manipulations are controlled by the state machine in the compose state. This vector of data from the special purpose is fed into the parallel PLU hardware to compute.

In one aspect, the AI compute engine block comprises an intra block connect bus 555. The intra block connect bus contains the control and data bus required to the communication with different block present within the AI compute engine block. The data path is a high bandwidth bus which supports wide data width data transfer (e.g., 256 bit/512 bit/1024 bit). The control path requires high bandwidth and less data width buses. Local memory is used by the AI compute engine blocks to compute. An interconnect bus within the lanes fills the local memory, which the AI compute engines use to compute the output. Accordingly, this makes the AI compute engine robust and hence does not require the interconnect bus for improved efficiency.

In one aspect, the AI compute engine block comprises AI solution model parameters stored in the AI solution models parameters memory 615 coupled to the processing engine. The state machine 525 reads and writes AI solution model parameters to and from the AI solution models parameters memory via the parameters interface (I/F). Each of the AI solution model parameters contains the configuration data such as input dimension of the model, weight dimension, stride, type of activation, output dimension and other macro parameters used to control the state machine. Thus, each layer could add up to 32 macro parameters.

In one aspect, the AI compute engine block comprises certain methods for using macro parameters by the control block to set different control parameters to run a layer. These control parameters are used by the state machine hardware to perform different functions such as retrieving, composing, executing, and transferring/writing back. The state machine 525 uses special purpose registers 645 to compose the data using the control parameters. This composed data are given to the AI-PLU to execute and the result is transferred and written back to the general purpose registers 550. Trigger in/out register trigger memory transactions and the type of state machine 525 to complete the job. The triggers are provided via trigger in/out interfaces (I/F). There are multiple parallel instances of processing engines running within the AI compute engine block.

In one aspect, the AI compute engine block comprises AI security parameters stored in the AI security parameters memory 620 coupled to the processing engine 505. The state machine 525 reads and writes AI security parameters to and from the AI security parameters memory 520 via the parameters interface (I/F). The AI security parameters contain the security configuration data corresponding to the AI application model that is currently running. Furthermore, it is dictated by the policy engine.

In various aspects, the present disclosure provides an AI-PLU for high speed wide width and parallel vector processing for extreme speed and efficiency. In one aspect, a generic AI-PLU is a special type of AI sub-block with one or more wide width (>512 bits) multipliers, adders, comparators whose parallel and pipelined arrangement can be re-configured such that one or more sets can run parallel and results from one set to another transferred in a pipelined fashion with maximum performance and power efficiency. A re-configurable AI compute engine block as shown in FIG. 4 may contain one or more AI-PLUs. Based on various arrangements an AI-PLU can take the shape or be implemented as various AI-PLU instances, namely:

a. An AI system processing logic unit (AI-PLU) instance within a convolutional neural network (CNN) AI processing block/engine configured for forward/backward propagation.

b. An AI-PLU instance within a max-pooling AI processing block/engine configured for forward/backward propagation.

c. An AI-PLU instance within an un-pooling AI processing block/engine configured for backward propagation.

d. An AI-PLU instance within a fully connected-recurrent neural network (FC-RNN) AI processing block/engine configured for forward/backward propagation.

It will be appreciated that a RNN is a class of artificial neural network, which has unlike feedforward networks recurrent connections. The major benefit is that with these connections the network is able to refer to last states and can therefore process arbitrary sequences of input. The basic difference between a feed forward neuron and a recurrent neuron that the feed forward neuron has only connections from its input to its output and has two weights, for example. The recurrent neuron instead has also a connection from its output again to its input and therefore it has three weights, for example. The third extra connection is called feed-back connection and with that the activation can flow round in a loop. When many feed forward and recurrent neurons are connected, they form a recurrent neural network. In addition, to CNN, FC, or RNN networks, which are described herein by way of example and not limitation, a user can introduce other blocks. Accordingly, the present disclosure is not limited in this context.

Figure 6:
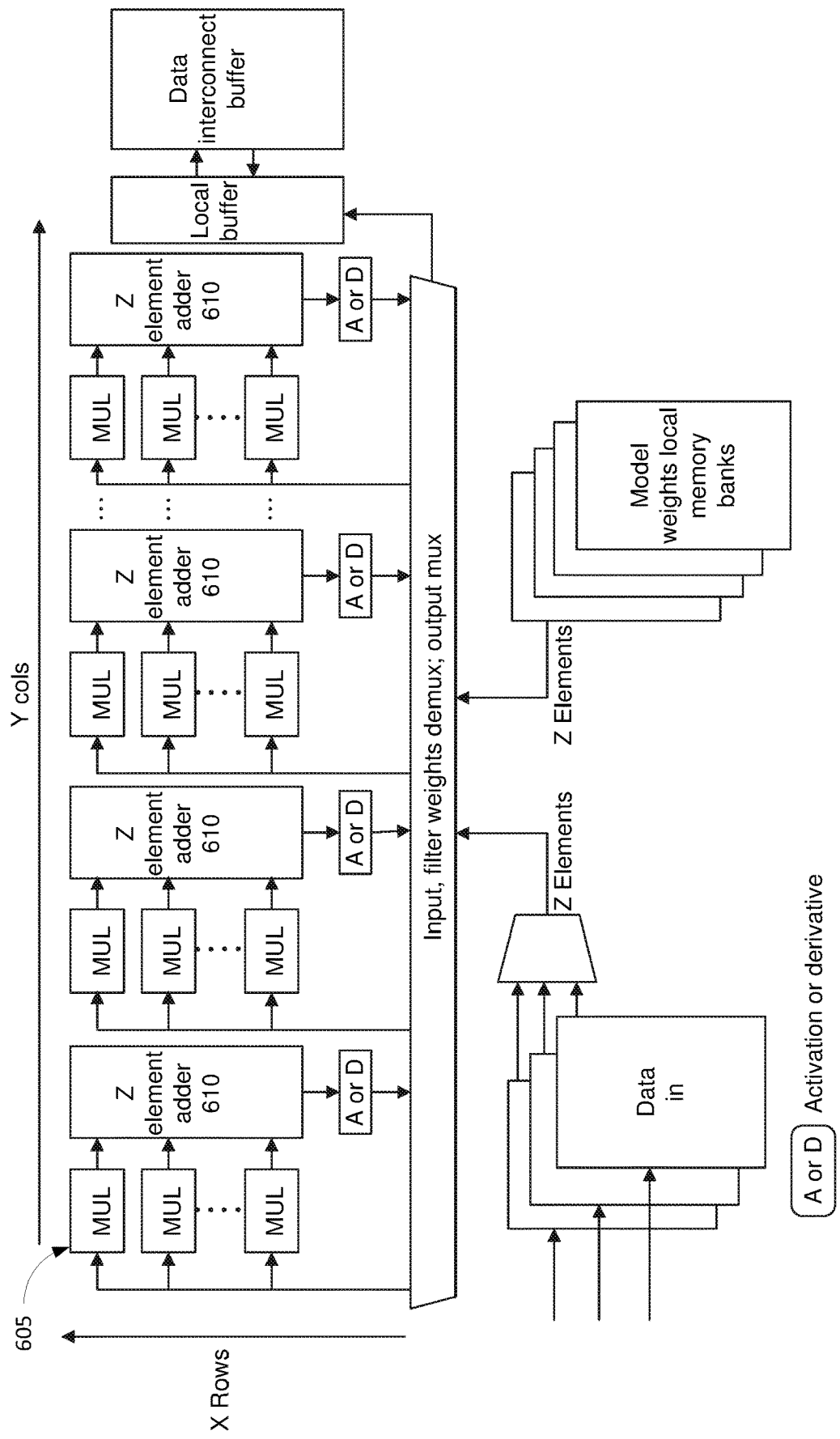
FIG. 6 is a diagram of an AI system processing logic unit (AI-PLU) instance within a convolutional neural network (CNN) AI processing block/engine for forward/backward propagation, in accordance with at least one aspect of the present disclosure.

FIG. 6 is a diagram of an AI system processing logic unit (AI-PLU) instance within a convolutional neural network (CNN) AI processing block/engine for forward/backward propagation, in accordance with at least one aspect of the present disclosure. In one aspect, the AI-PLU CNN instance contains an array of multiplier functional units 605 and adder functional units 610. The arrangement of the multiplier and adder functional units 605 and 610 in the CNN is dependent on the weight dimension and on forward and backward flow, as described below.

In one aspect, the arrangement of the multiplier and adder functional units 605 and 610 in the CNN is dependent upon the AI-PLU CNN forward instance. In forward flow, the functional units are arranged to multiply and add. The X rows represent the weight dimension and the Y columns represent the number of outputs that can be computed in parallel. Therefore, depending on the weight dimension, the number of outputs computed will decrease or increase. Smaller weight dimensions produce a large number of outputs. Similarly, larger weight dimensions produce a small number of outputs. All of these data paths are supported by multiplexing functional units depending on weight dimension. Input and weight is taken as the input. Both are multiplied and added. Then, depending on the activation, the output is moved to the output multiplexer. Here the computations are memory bound and hardware bound. The memory can fetch at least 64 byte/128 byte at a time. Therefore, the speed of the execution would depend on the available hardware. Hence if the inputs required for calculating the Y outputs are within 64 Byte/128 bytes of the vector limit, then those outputs could be processed in the same cycle. For example, if M is the output dimension of the CNN output, then it would take (M/Y)*Weight of the row dimension cycle to compute M outputs. Again, the weight of the row dimension parameter can be removed if the multiple rows of weights can be fetched and make the input dependent on those multiple rows of weights.

In one aspect, the arrangement of the multiplier and adder functional units 605 and 610 in the CNN is dependent upon the AI-PLU CNN backward instance. In backward flow, backward propagation requires three computations. First is to calculate weight updates, second is to compute delta sum, and third is bias computation. In backward propagation, the output width is variable. The output provided by the weight update AI-PLU is dependent upon the dimension of the weight. The new weight that is calculated is then forwarded to the delta sum processing engine to calculate the delta matrix. The input for the weight update is the delta from the previous layer, the learning rate, and the output of the previous layer. The delta sum computation requires the updated weight, learning rate, and the delta as the input to calculate the delta sum. Weight update is a summation of the previous weight plus-or-minus the new error. The AI-PLU will calculate the error using the previous layer output and the delta. The old weight is then updated with error. The newly calculated weight is forwarded to delta sum updater that uses the new weight and delta value to calculate the delta sum. The bias update is a sum of old bias minus the error. The error is summation of all delta value times the learning rate. This error is subtracted from the old bias to get the updated bias. The weight update includes multiplication and adder units. The delta sum also includes shift, multiplication, and adder units.

With reference now back to FIG. 3, each AI system lane comprises a set of AI processing blocks-FC, CNN, LSTM, RNN (LSTM and gated recurring unit [GRU] cells), Max-Pool, AvgPool, normalization, SoftMax, sorting, among others, as foundational blocks/engines. The AI system lane is a security centric AI application solution hardware compute engine, as described in connection with FIGS. 4-6, for example. Returning to FIG. 3, each of the available blocks/engines can further be configured to activate specific sub blocks within it. An AI processing chain can be created by dynamically composing and accessing foundation blocks in a pipelined and parallel manner to process a given model using the AI system lane composer function as described hereinbelow. Each AI system lane contains local internal memory cells (e.g., SRAM) units to store parameters such as weights, bias and input around each foundational block. All the internal memories are not only connected to the foundational blocks but they also connected to global memory to receive scheduled data bursts. Each foundational block is configurable and expandable. Depending on the composition, one foundation block can trigger another foundation block in the AI processing chain.

Figure 7:
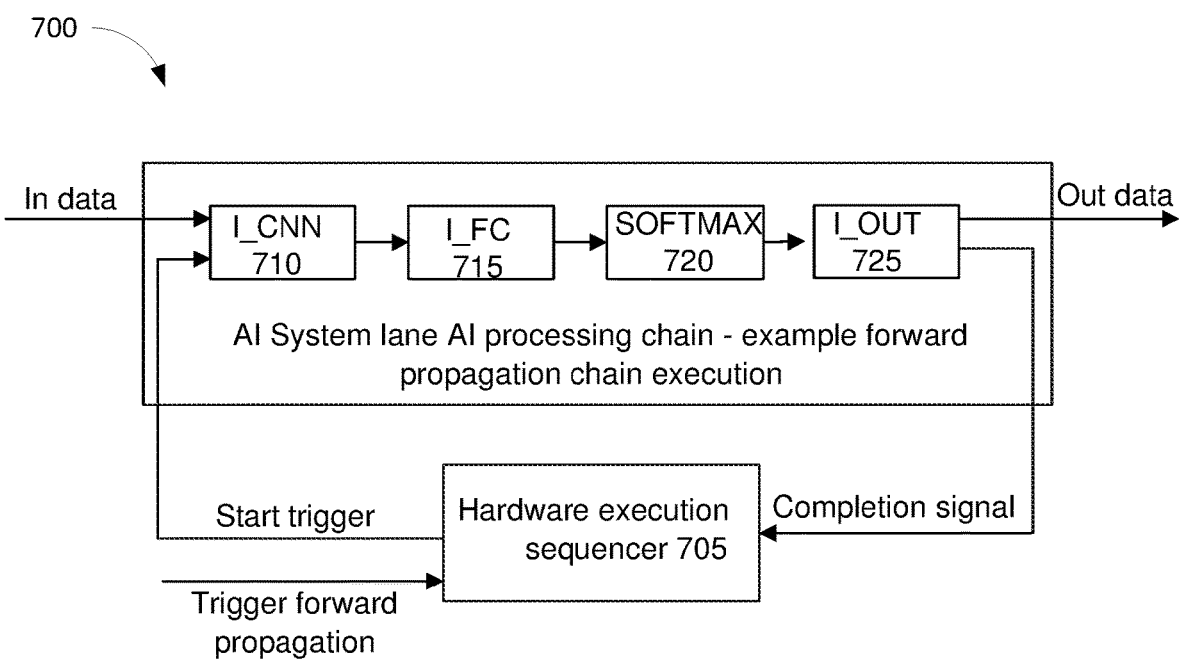
FIG. 7 is a diagram of an AI system lane processing chain configured in a forward propagation execution chain, in accordance with at least one aspect of the present disclosure.

FIG. 7 is a diagram 700 of an AI system lane processing chain configured in a forward propagation execution chain, in accordance with at least one aspect of the present disclosure. When executing in a forward propagation chain, for example, an AI system lane processing chain can be created by composing high level constructs such as I_CNN 710, I_FC 715, I_SOFT MAX 720, and I_OUT 725 processing units to perform the functions of the foundational blocks/engines described with reference to FIGS. 4-6, for example. A hardware execution sequencer 705 that is part of an orchestrator can trigger the I_CNN processing unit 710. The CNN processing unit 710 and the MaxPool processing unit that is part of I_CNN processing unit 710 takes in as input configuration values which include the weight dimension, input dimension, stride, depth, and filters. The network dimension is used by the CNN and the MaxPool controller to run the inference and backward propagation on the model data. Accordingly, once the CNN engine is triggered to process the forward pass, it triggers the MaxPool controller to process the CNN filter output in a pipelined manner.

Once all the filters are processed, the data is saved to main memory. If multiple CNN layers are being processed, the intermediate data is stored within the foundation block using low latency internal memory (e.g., SRAM) and written to the external main memory (e.g., double data rate [DDR], quad data rate [QDR], high bandwidth memory [HBM]) after all the CNN layers are calculated. Since I_FC 715 is next in the AI system lane processing chain for a given model, it is automatically triggered. The FC engine can read weight, bias and input from local memory cells to process it on the fly. The local memory cells are in turn connected to main memory to receive continuous corresponding data bursts until the FC layer processing is complete. Once the FC processing is complete it triggers the SoftMax engine if it is the next in the AI system lane processing chain. Once the SoftMax engine 720 finishes execution, it invokes the result out engine, i.e., I_OUT processing unit 725. The I_OUT processing unit may comprise a sorting engine. Depending on the particular configuration, the sorting engine can sort before writing the results in a configured format to the local or global location depending on the composition criteria of AI system lane processing chain for storing results. This result can be read by the external hardware through local transfer interface (e.g., peripheral component interconnect express [PCIE] or solid state drive [SSD], etc.) or network interface (e.g., Ethernet, wireless, etc.) connections.

Figure 8:
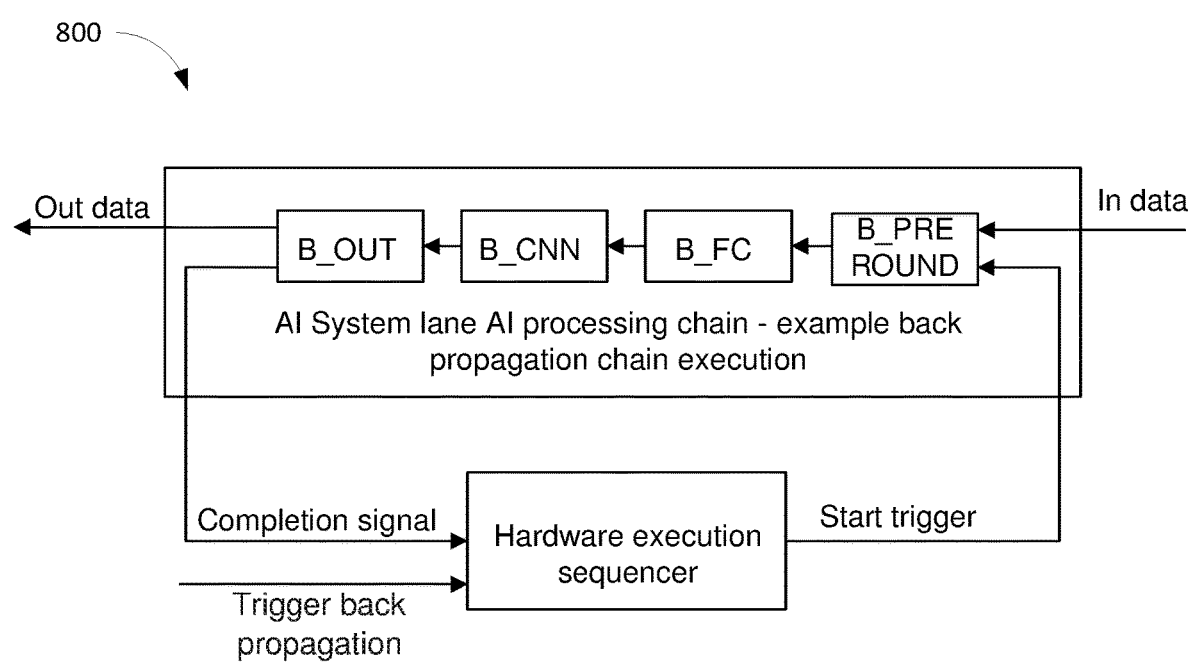
FIG. 8 is a diagram of an AI system lane processing chain configured in a backward propagation execution chain, in accordance with at least one aspect of the present disclosure.

FIG. 8 is a diagram 800 of an AI system lane processing chain configured in a backward propagation execution chain, in accordance with at least one aspect of the present disclosure. Similar to the forward propagation execution chain shown in FIG. 7, for example, FIG. 8 shows that when running a backward propagation chain, for example, the AI system lane processing chain can be created by composing high level constructs such as B_PREROUND, B_FC, B_CNN MAX, B_OUT processing units. A hardware execution sequencer that is part of an orchestrator can trigger the B_PREROUND processing unit. The B_PREROUND processing unit comprises sub processing blocks such as data normalization, initial learning algorithm (namely target output and expected output comparison, etc.), among other sub processing blocks. The B_PREROUND processing unit in turn triggers the B_FC processing unit. The B_FC processing unit comprises a set of FC backward propagation algorithms and updates. For example, the B_FC processing unit reads the old weight and previous layer delta values directly from memory, computes the results and saves them in memory on the fly. Upon completion of the B_FC processing, the B_FC processing unit automatically triggers the B_CNN processing unit with the required transformed handoff data. The B_CNN processing unit comprises sub processing blocks such as CNN backward propagation algorithms blocks, Unpool blocks, CNN weight calculation, update, delta sum calculation and update etc., among other sub processing blocks. All these backward propagation processing blocks can be arranged in a pipelined and parallel manner to achieve the required AI solution model processing flow and desired performance. Once complete, the B_CNN processing unit automatically triggers the B_OUT processing unit. The B_OUT processing unit comprises the necessary processing blocks to arrange the resulting data and make it ready for forward propagation as well as co-ordinate hardware functions to synchronize with a hardware execution sequencer so that the resulting data can be fused at a virtual AI system lane processing chain in case more than the AI system lane processing chain is participating in the execution of the AI solution model.

Figure 9:
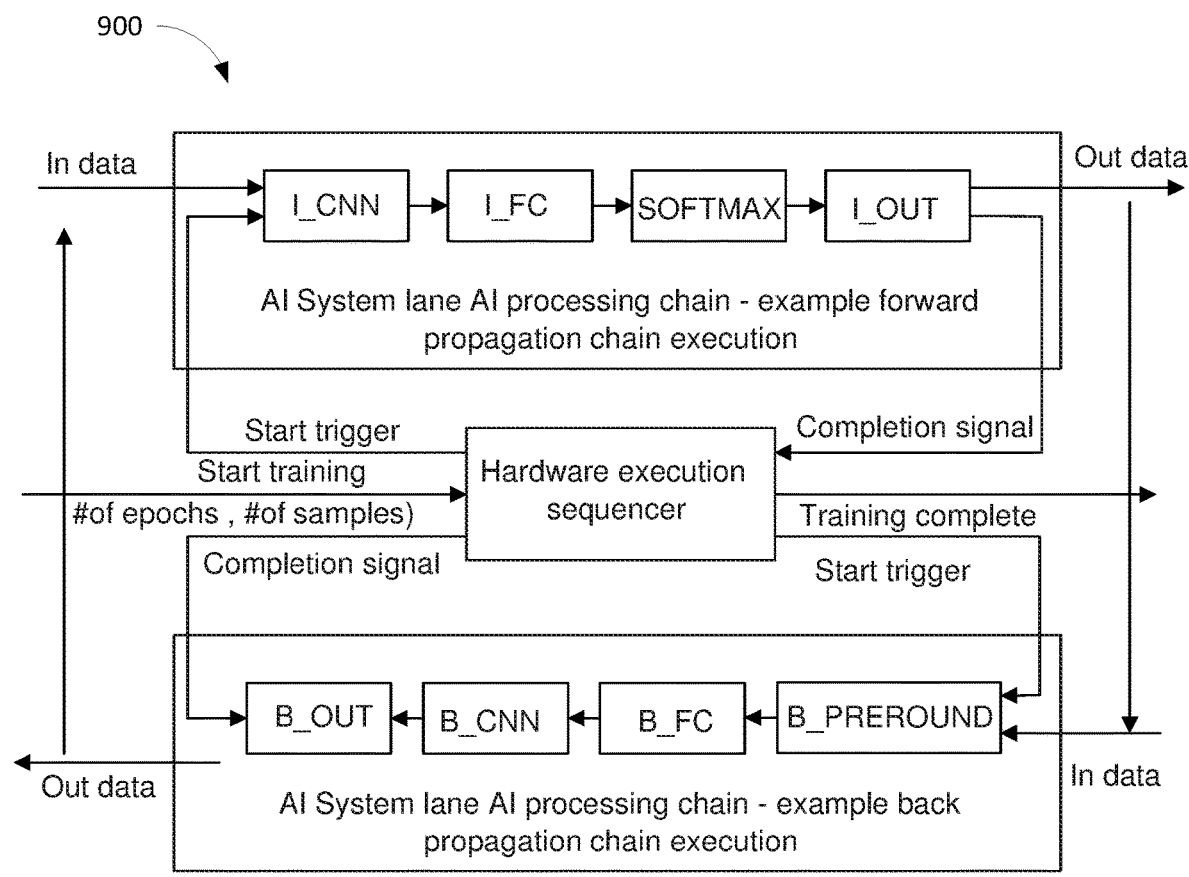
FIG. 9 is a diagram of an AI system lane processing chain may comprise both forward and backward propagation elements in a single AI system lane, in accordance with at least one aspect of the present disclosure.

Finally, as shown in diagram 900 of FIG. 9, an AI system lane processing chain may comprise both forward and backward propagation elements in a single AI system lane, in accordance with at least one aspect of the present disclosure. If both forward and backward propagation execution chains are executed together, then the hardware execution sequencer triggers the forward AI system lane processing chain to run first on the initial/intermediate weights and then upon receiving a completion signal, the hardware execution sequencer triggers the backward propagation AI system lane processing chain to update the weights and bias values using the forward results. The data required by the backward propagation AI system lane processing chain from the forward propagation AI system lane processing chain is stored in the local memory by I_OUT. If MaxPool is enabled within the I_CNN layer then the index also is generated by the corresponding forward layer and stored in the local memory. The local memory used for I_CNN for the forward propagation AI system lane processing chain is used by the B_CNN of the backward propagation AI system lane processing chain, resulting in zero copy.

Figure 10:
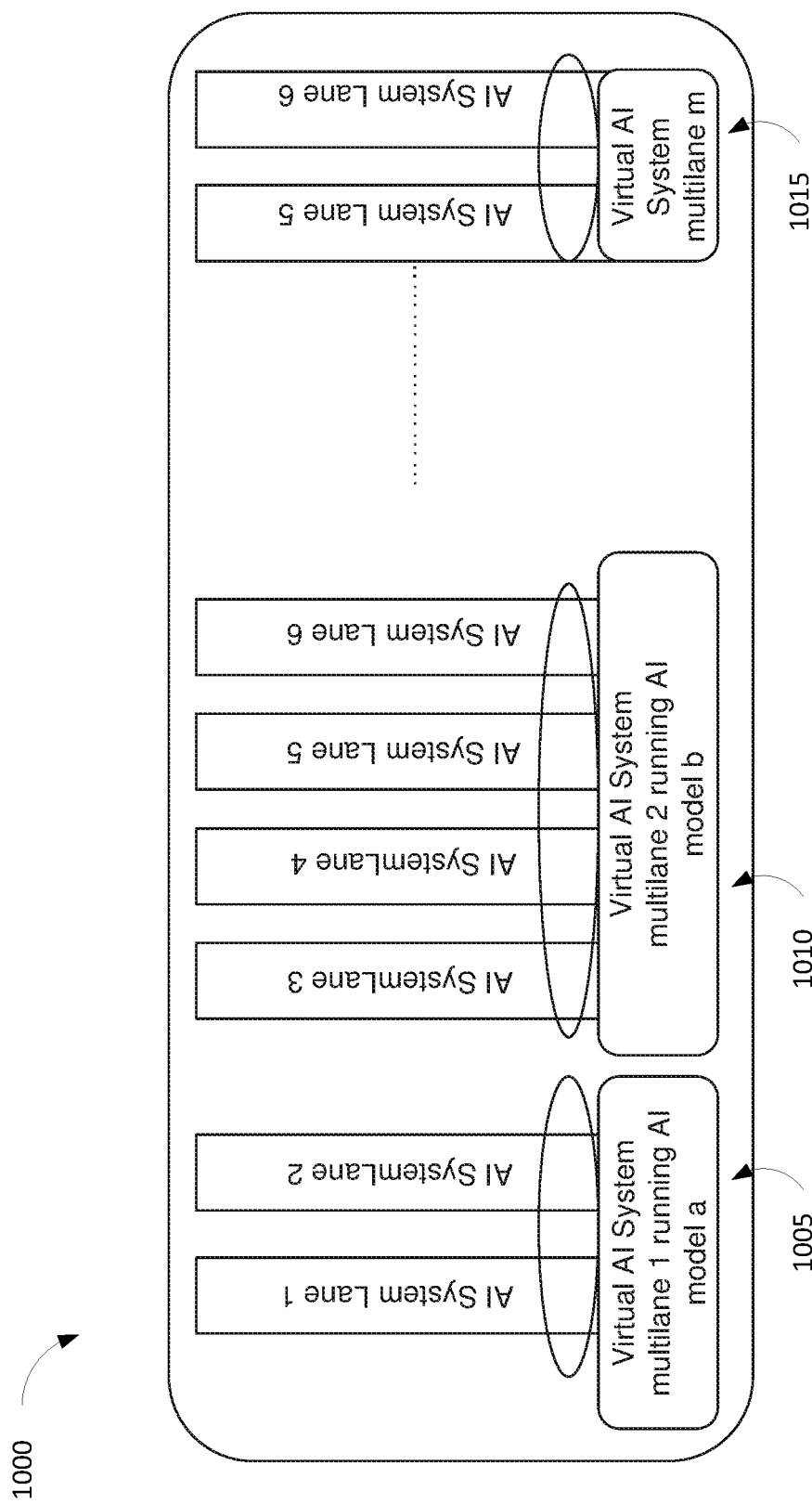
FIG. 10 is a diagram of a virtual AI system lane created to execute, training and inference, in accordance with at least one aspect of the present disclosure.

FIG. 10 is a diagram 1000 of a virtual AI system lane created to execute, training and inference, an AI solution model in accordance with at least one aspect of the present disclosure. A virtual AI system lane may be implemented by first creating one virtual lane. Virtual AI system lanes according to the present disclosure are allocated to process an AI solution model that meets a given performance criteria and other requirements rather than employing traditional VMs and GPUs allocation to meet AI software framework performance requirements to process an AI solution model.

As shown in FIG. 10, the virtual AI system lane is created to execute the AI solution model by dynamically allocating one or more AI system lane hardware units based on the size of the AI solution model and the required execution speed to create a virtual AI system lane. All ideas must be aligned so that it can be compared with GPU virtualization. To create full virtualization, different groups of virtual AI system lanes are configured to execute different models. As shown in FIG. 10, a first virtual AI system multilane 1005 comprises two AI system lanes configured to execute AI solution model "a." A second virtual AI system multilane 1010 comprises four AI system lanes configured to execute AI solution model "b." An arbitrary virtual AI system multilane 1015 comprises two AI system lanes configured to execute AI solution model "m."

Figure 11:
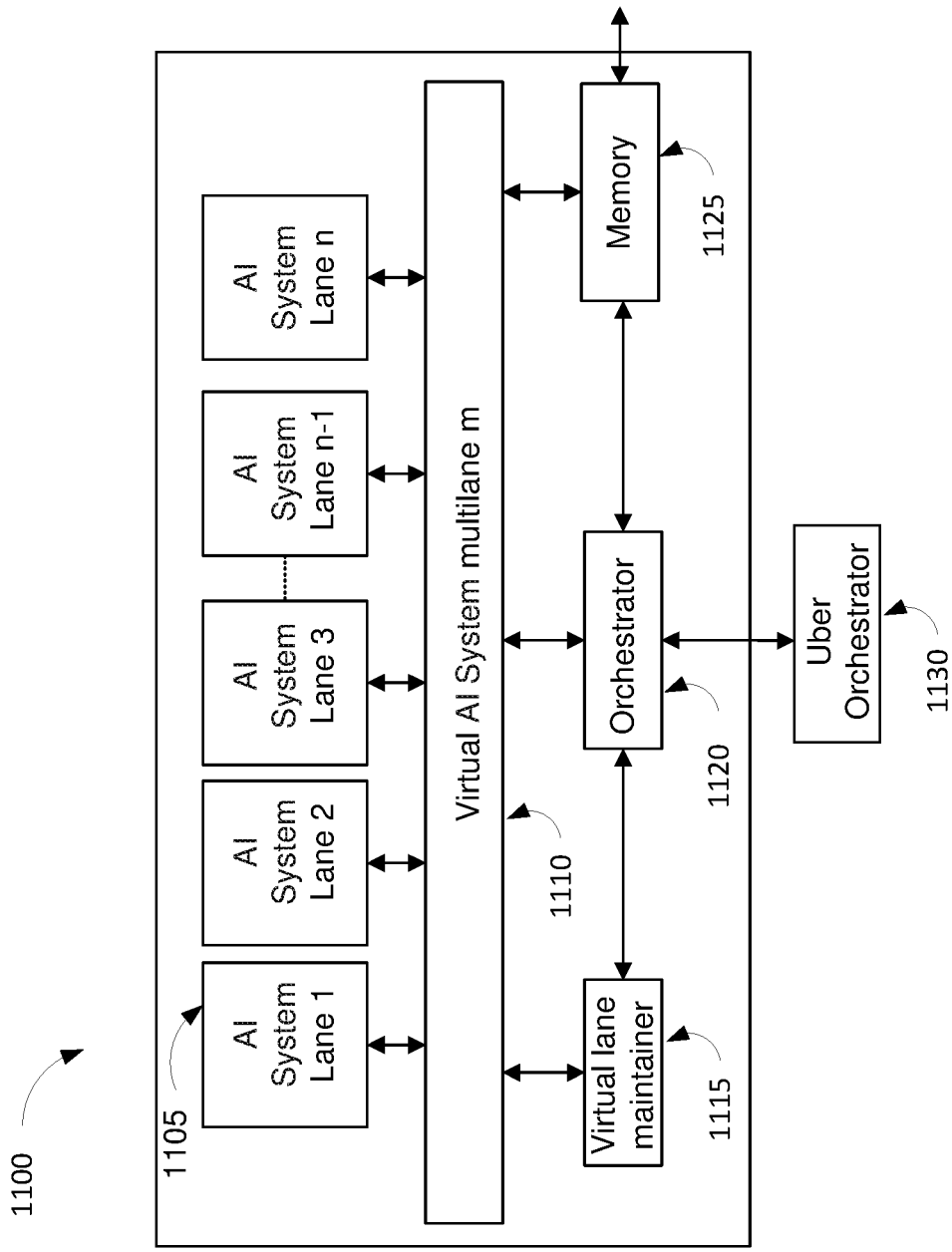
FIG. 11 is a diagram of a virtual AI system multilane, in accordance with at least one aspect of the present disclosure.

FIG. 11 is a diagram 1100 of a virtual AI system multilane, in accordance with at least one aspect of the present disclosure. Depending on the AI solution model network structure and performance requirement of the network, the AI solution model calculation is mapped to multiple lanes 405, etc., in order to create the virtual AI system multilane 1110 shown in FIG. 11. Each element of the virtual AI system multilane processing chain is configured via a virtual lane maintainer 1115 and a virtual lane composer. For example, the fine grain processing behavior and the structure of the CNN engine (namely, number of layers, filter dimensions, number of filters in each layer, etc.) and the FC engine (namely, number of layers, number of neurons per layer, etc.) can be configured for an AI solution model execution using the lane composer functions. As described in previous sections of this disclosure, the virtual AI system multilane processing chain can be triggered via hardware execution sequencer where each current hardware element in the chain triggers the next element (a block, sub block, etc.) in the chain, when it completes the task assigned to it. For instance, if the CNN engine is configured with multiple filters and multiple layers, then the CNN engine completes all the filters and layers before it triggers the next element in the chain i.e., the FC engine.

An initial trigger to execute a given AI solution model is initiated via a microcontroller, which in turn triggers an uber orchestrator 1130, for example. The uber orchestrator triggers corresponding orchestrators 1120 of the virtual lanes that participate while in executing the AI solution model. The memory 1125 may be accessed to obtain the desired information for executing the AI model. The hardware execution sequencers components of the participating orchestrators, execute the AI system lane processing chains to completion as per configuration. For example, a request may be initiated to train an AI solution model with a number of epochs, number of samples along with a pointer to location where samples are available. This can be used as a trigger to activate the orchestrator 1120 of the participating virtual lane, which in turn sends a multicast trigger to all AI system lane processing lane hardware execution sequencers that are part of the virtual lane.

Figure 12:
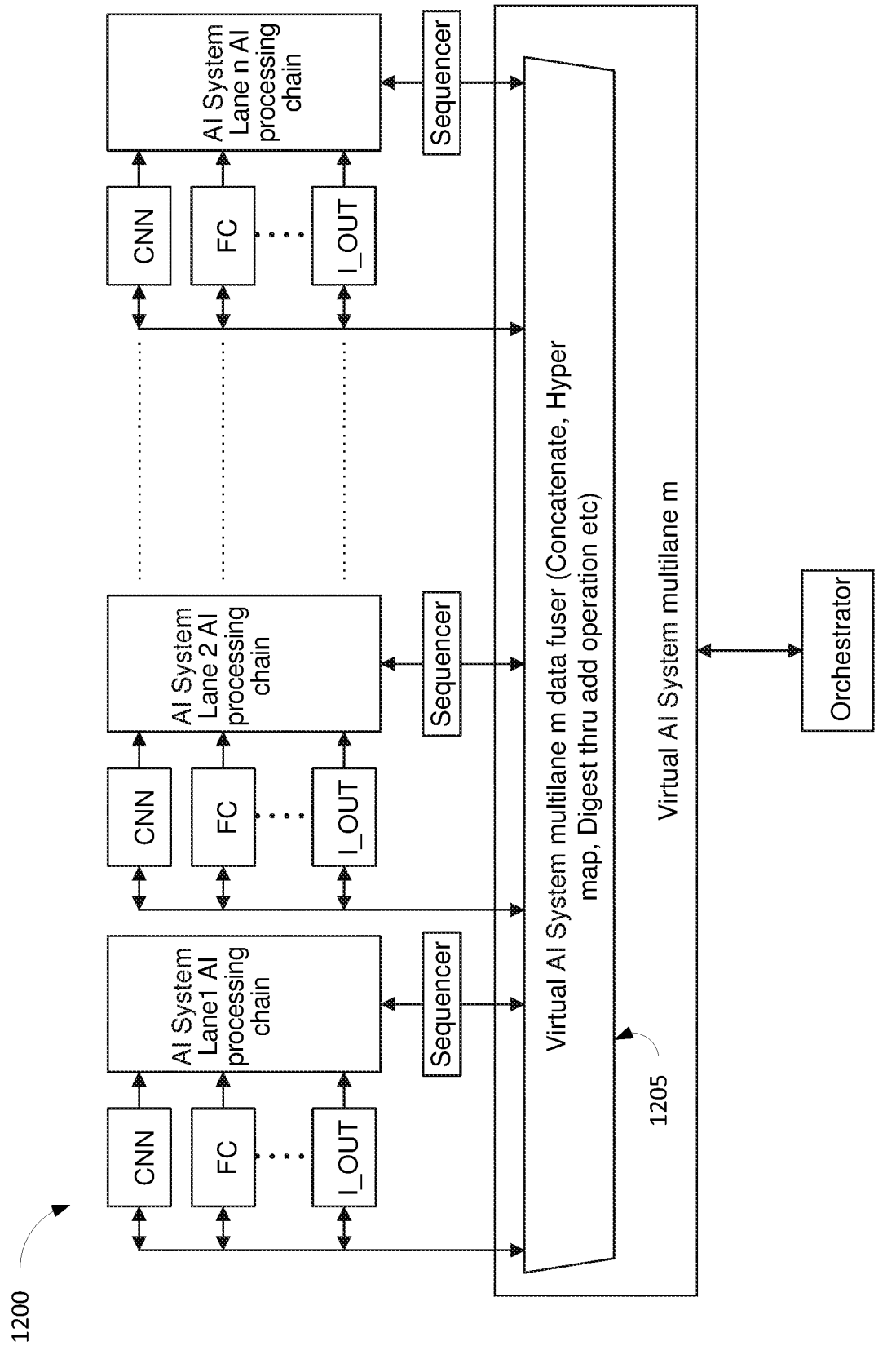
FIG. 12 is a diagram of a virtual AI system multilane comprising a data fuser, in accordance with at least one aspect of the present disclosure.

FIG. 12 is a diagram 1200 of a virtual AI system multilane comprising a data fuser 1205, in accordance with at least one aspect of the present disclosure. The data fuser 1205 is configured to concatenate, hyper map or digest, through operations such as addition, the results received from different AI system lanes that are perfectly aligned in the frequency, time and space domains. If there are L AI system lanes and M filters in an AI solution model, then the L/M AI solution model computation can be mapped to each AI system lane within a virtual AI system multilane. Once a layer is computed all the results are concatenated from all lanes and fed to the next layer computation. Accordingly, a speed up of xL is obtained. The input can be shared to all AI system lanes which are scheduled to the work on the AI solution model. This enables the computation of different AI solution models at different AI system lanes.

Figure 13:
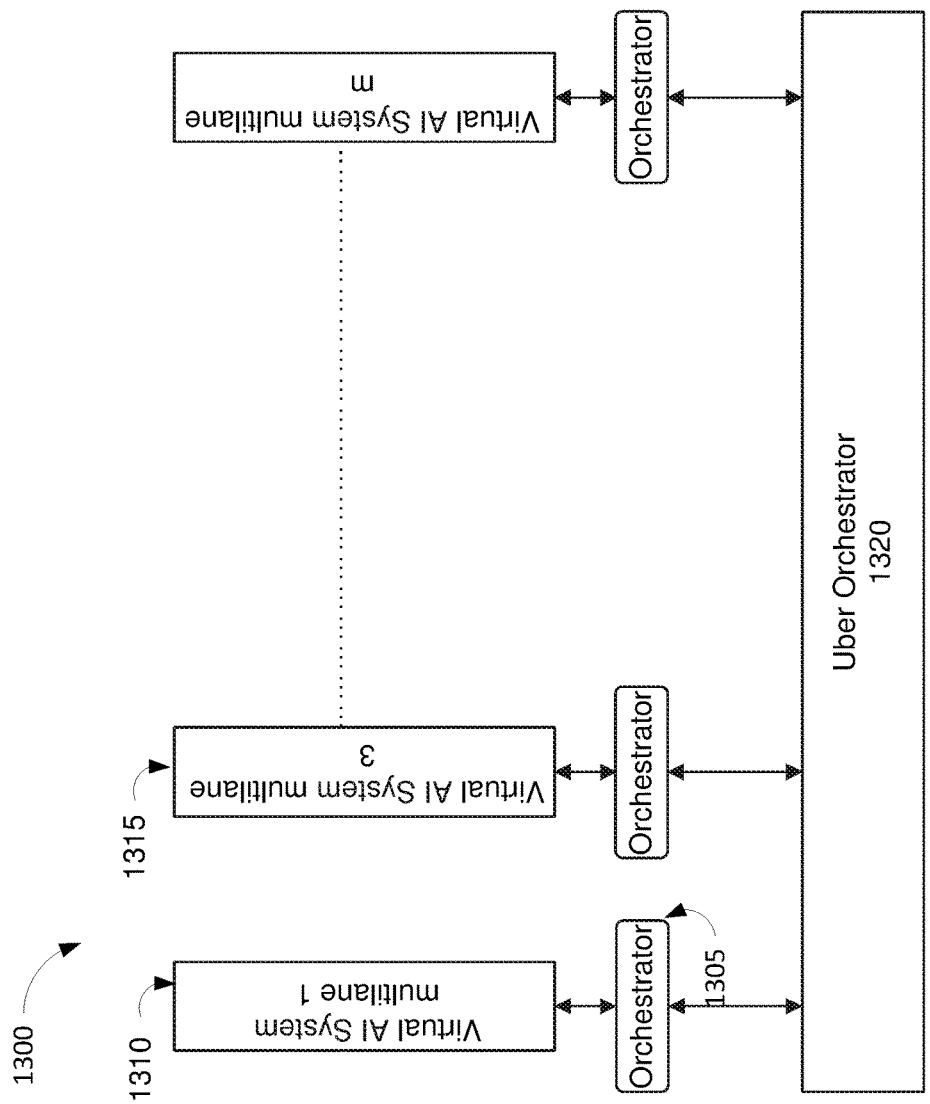
FIG. 13 is a diagram of a virtual AI system multilane comprising an uber hardware orchestrator, in accordance with at least one aspect of the present disclosure.

Referring to FIG. 13, illustration 1300 is a diagram of a virtual AI system multilane comprising an uber hardware orchestrator 1320, in accordance with at least one aspect of the present disclosure. Coupled to the uber orchestrator 1320, the AI system lane processing hardware comprises an AI system processing hardware orchestrator 1305 to setup and execute the different workloads on the each virtual AI system multilane 1310, 1315, etc., as well as the AI system lanes within the virtual AI system multilanes. As used hereinbelow, AI system lanes is used to refer to each virtual AI system multilane as well as the AI system lanes within the virtual AI system multilanes. The AI system processing hardware orchestrator 1305 operates in a hierarchical fashion. In this sense, each virtual AI system multilane 1310, 1315, etc., is controlled by an instance of the AI system processing hardware orchestrator 1305. An uber hardware AI processing hardware orchestrator 1320 is provided to oversee all AI lanes orchestrator instances. All AI system lanes report to the their respective AI processing hardware orchestrator 1305 whether they are busy or not. Depending on different criteria of the workload, the AI system processing hardware uber orchestrator 1320 will schedule the task to the specific engines in each of the AI system lanes. The AI system processing hardware uber orchestrator 1320 comprises the report of all the engines in the AI system lanes that are available to compute and also the engines in the AI system lanes that are busy. The AI system processing hardware uber orchestrator 1320 maintains a status table of AI system lanes to indicate whether the corresponding specific hardware of the AI system lane is busy or not.

Figure 14:
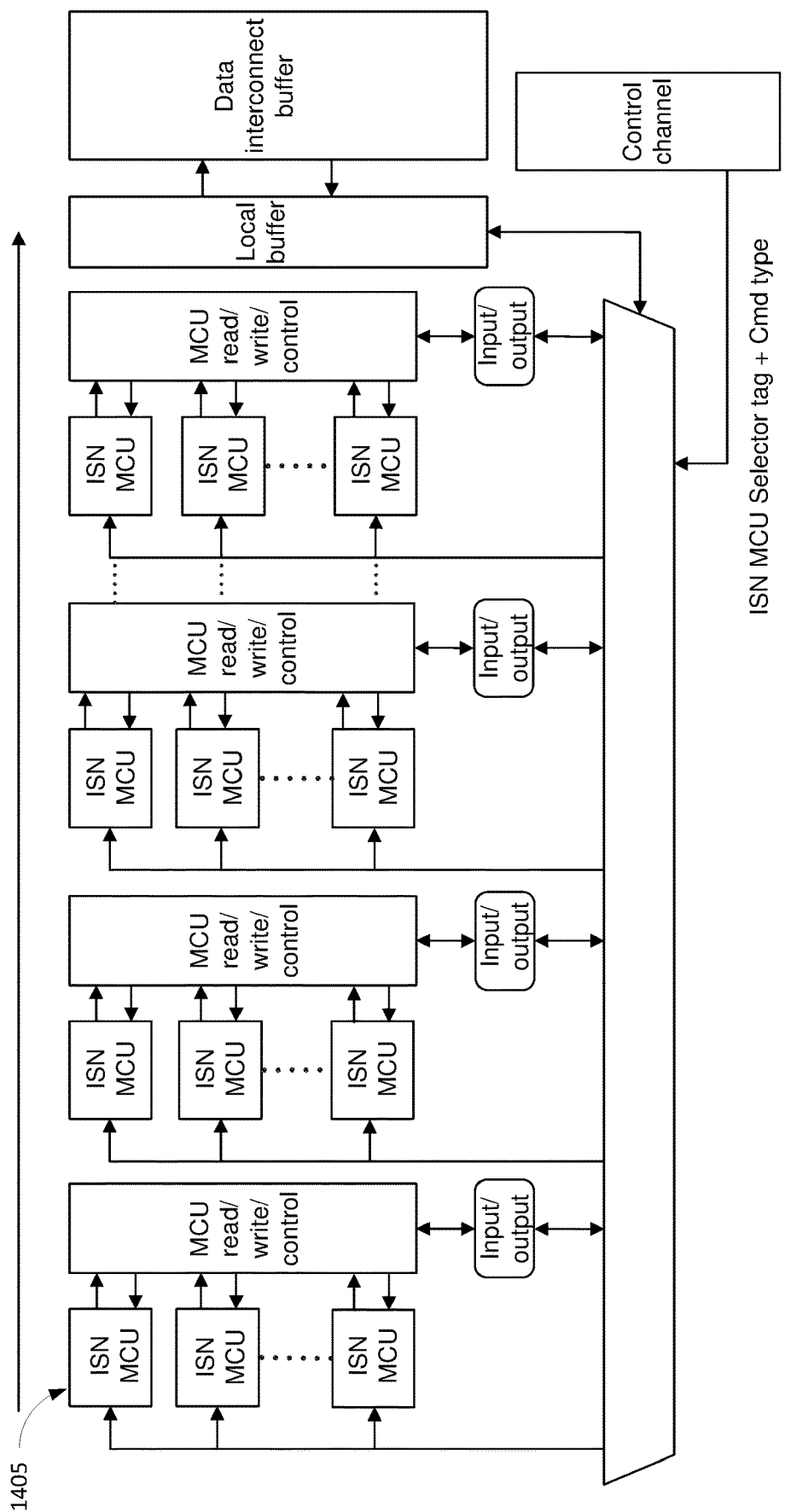
FIG. 14 is a diagram of an adaptive intelligent processing logic unit (ADI-PLU) comprising a collection of intelligent sense neuro memory cell units (ISN MCUs), in accordance with at least one aspect of the present disclosure.

FIG. 14 is a diagram of an adaptive intelligent processing logic unit (ADI-PLU) comprising a collection of intelligent sense neuro memory cell units (ISN MCUs), e.g., ISN MCU block 1405, in accordance with at least one aspect of the present disclosure. An ADI-PLU may contain an homogeneous or a heterogeneous collection of ISN MCUs and acts like a memory block and connected to a data and control interconnect. In one aspect, a collection of ISN MCUs sense learning cells with AI learning, training and inference are addressable like memory cells. Each of the ISN MCUs within a ADI-PLU can be accessed (read/write) just like one or more memory cell(s) using appropriate selector tag and command type.

There can be one or more ADI-PLUs than be interconnected via a hierarchical non-blocking interconnect bus with lookup and forwarding table for automatic forwarding of data between ADI-PLUs and their respective ISN MCUs. The type of forwarding from/to ADI-PLU and their respective ISN MCUs includes one-to-one forwarding, one-to-many forwarding, many-to-one forwarding and many-to-many forwarding, respectively.

Moreover, an ADI-PLU can be accessed from a re-configurable AI compute engine as a typical memory block. It can be defined, organized, tied to the overall AI processing chain. Multiple sets of ADI-PLUs can be accessible from a re-configurable AI compute engine as described herein. ADI-PLUs can be organized for instance to represent a set of inputs, weights and outputs that can represent a user specified AI learning model. Instead of training in the traditional processing domain, they are sense learned and adjusted and stored in multi-bit memory cells to represent values that may correspond to an AI learning model input, weight and output. Creating the model and associating the sense input, weight and output to the AI learning model can be done by domain specific scientists based on a given problem and its expected outcome or can be done automatically through re-enforced feedback learning.

Figure 15:
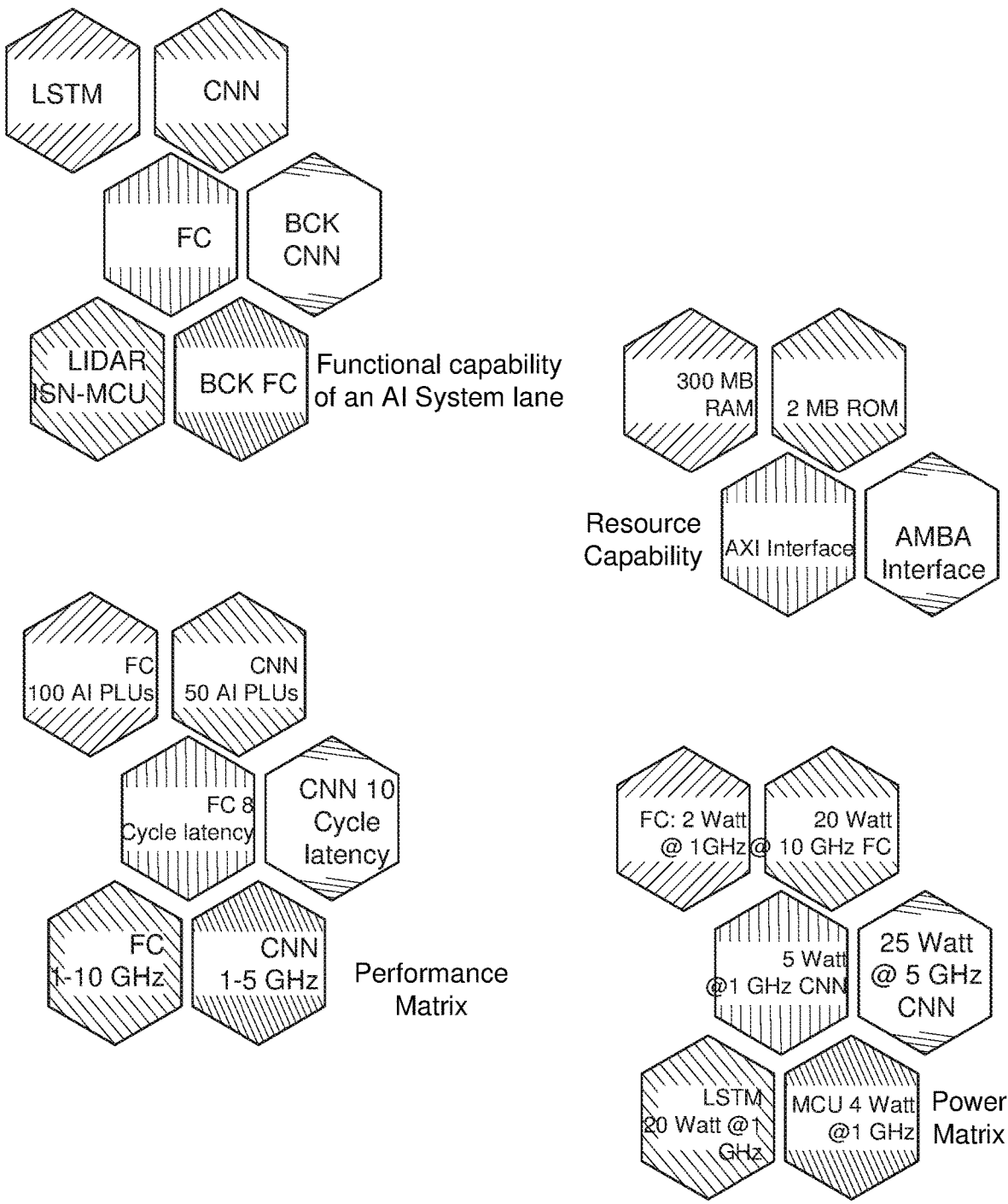
FIG. 15 shows a visual depiction of an AI system lane capability matrix, that contains information of the capability of each AI system lane, according to some embodiments.

With reference now to FIGS. 7-14, in various aspects, the AI processing hardware orchestrator comprises information of the capability of each AI system lane. This information is referred to as an AI system lane capability matrix. An example of this is depicted visually in FIG. 15. It comprises functional capability, performance capability, resource capability and energy matrix, among other elements. The functional capability will inform about the functionality corresponding to the AI system lane, the engines or processing units that the AI system lane processing chain can support (e.g., support CNN, LSTM, backward propagation, etc.), among other elements. The performance information includes the performance metrics for the AI system lane as well as the operating clock frequency for that range (e.g., maximum turbo frequency for that lane). The performance information also contains information regarding the number of parallel hardware elements present in the AI system lane to speed up the computation. Resource capability provides information regarding the storage requirements for each lane. The energy matrix provides the static power dissipation and dynamic power dissipation of a particular AI system lane. Accordingly, all of this information can be employed by the AI system processing hardware orchestrator to schedule the task to the AI system lane.

In one aspect, each virtual AI system multilane comprises a virtual lane maintainer, see e.g., FIG. 11. The virtual lane maintainer has two functions. One function is to compose the configuration of the AI system lane processing chain of a given AI system lane to complete the type of task assigned. For example, as described in the AI system lane section of this disclosure, the AI system lane processing chain can be configured as a forward processing chain or backward processing chain or combinations thereof. In various aspects, the AI system lane may support either or both of these processing chain configurations. For example, as described in the AI system lane section of this disclosure, the AI system lane enables a forward AI system lame processing chain with I_CNN, I_MAXPOOL, I_FC, I_SOFTMAX, I_OUT processing engines configuration with configuration data. The AI system lane maintains and writes all the configuration data to the respective processing engine in each AI system lane and triggers each processing engine depending on the flow of execution defined in the AI system lane processing chain to a process an AI solution model. A hardware execution sequencer is triggered to drive the AI system lane processing chain execution to complete. The hardware execution sequencer is scheduled to complete all the configured tasks assigned to the given AI system lane. Once done, the hardware execution sequencer erases the configuration data and messages to the AI system lane processing hardware orchestrator that it is sitting idle and puts the AI system lane in sleep mode to reduce the power dissipation.

In one aspect, the AI system lane processing hardware orchestrator has a lane composer and a lane decomposer. The lane composer builds the hardware increased pipeline or increased parallel hardware. This also will depend on the number of functional units that are available in the data path. The lane decomposer is configured to remove hardware already built by the lane composer.

In one aspect, the AI system lane processing hardware orchestrator will take the AI solution model requirement as the input. See, e.g., FIG. 11. The AI system lane processing hardware orchestrator comprises the size of the AI solution model, the functional construct required to execute the AI solution model, the performance requirement of the AI solution model, and the energy requirement to be met. The AI system lane hardware execution sequencer will determine all the AI system lanes which can meet the performance requirement. Also the AI system lane hardware execution sequencer will calculate the number of AI system lanes required to meet the performance with a current energy footprint.

AI system lane virtualization functionalities show how an AI solution model can be mapped to an AI system lane. Functionalities may include an available AI system lane pool to maintain a list of available AI system lanes. Functionalities may include a used AI system lane pool to maintain a list of used AI system lane pools.

An AI system lane capability matrix may comprise functional capabilities/AI constructs, a performance capability matrix, resource capabilities, and an energy matrix, among other functional related elements, for example. Functional capability/AI constructs may include CNN, FC, LSTM, RNN, MaxPool, AvgPool, normalization, SoftMax, and sorting functional unites or engines, among other elements, for example. A performance capability matrix includes elements such as clocking, size, number of sensor processing per unit of time, among other elements, for example. Resource capabilities may include the size of internal memory, among other resources, for example. An energy matrix may include the static power dissipation and dynamic power dissipation of a particular AI system lane, among other energy related elements, for example.

A lane maintainer may include may comprise a lane composer, a lane decomposer, and a foundation module expander, among other lane maintenance related elements, for example. A lane composer may include an AI system lane processing chain to activate functions to be activated, a pipeline expressor, a parallelism expressor, among other lane composition related elements, for example. A lane decomposer may include a lane number, among other lane decomposition related elements, for example. A foundation module may include may include foundation block parameters, among other foundation block related parameters, for example.

AI solution model requirements capability may comprise the size of an AI solution model, functional needs of an AI solution model functional element selection, performance needs of an AI solution model, and energy needs, among other AI solution model requirements capabilities, for example. In one aspect, the energy needs may include assisting in turning on/off a given logic block/capability block in a lane, among other energy related needs, for example.

A virtual lane maintainer may comprise a create/allocate functional element, a destroy/deallocate functional element, an update functional element, an AI solution model to virtual lane mapper, an AI solution model virtual lane demapper, and a lane monitor, among the virtual lane maintenance functional elements, for example. A create/allocate functional element may include an input AI solution model requirements capability, an output virtual lane number, a lane reclaimer, among other related create/allocate functional elements, for example. A destroy/deallocate functional element may include an input virtual lane number, among other related destroy/deallocate functional elements. An update functional element may include an input AI solution model requirements capability, among other related update functional elements.

Functionalities may include a list of virtual lane structures. A virtual lane structure may comprise total number of lanes, a list of specific AI system lane in use, an AI solution model being mapped, and capabilities being enabled.

The systems and methods for AI with a flexible hardware processing framework according to the present disclosure provide various advantages compared to conventional AI architectures. Compared to conventional AI architectures, the present AI systems and methods provide low power, real-time and continuous AI training making the present AI systems and methods well suited for large set of edge/fog environment such as autonomous vehicles, health care, industrial internet of things (IoT), smart cities, smart spaces, and more.

In one aspect, the AI system lane engine according to the present disclosure contains lanes which are specific engines to compute the CNN, FC, MaxPool, RNN computations. In contrast, in conventional AI architectures, a GPU fits all the computation into a large array of single instruction multiple data (SIMD) blocks.

In another aspect, the AI system lane according to the present disclosure is configured to enable all the engines to run in parallel/pipeline and since each engine is efficient in running each algorithm. The output of one engine can be forwarded from one engine to another thus keeping all engines busy. Completing an algorithm is faster and uses a smaller energy footprint that comparable conventional AI architectures. If one input is given, then the output from each engine is passed from one engine to another to complete the full model flow. If an entire model can be mapped to all the engines in the AI system lane, then real time processing of the input data can be executed. In contrast, running two algorithms such as CNN and FC together in a conventional AI architecture employing a GPU with a SIMD structure is very inefficient. Accordingly, the conventional AI architecture executes each of the CNN layers and then executes each of the FC layers. Multiple CNN layers cannot be mapped to the same GPU if they are running single input data. Therefore, a GPU may try to execute batch inputs to make them efficient. However, in batch configuration, a GPU may execute several inputs for the same CNN/FC layer, then save the partial output and execute other layers on the partial output data to complete the model. Accordingly, real time processing of data is not possible for conventional AI architectures employing a GPU with a SIMD structure.

In yet another aspect, the AI system lane according to the present disclosure is configured to execute with a layer wise granularity and hence if a layer is executed in a pipeline then there is not wastage in time. In contrast, in conventional AI architectures employing a GPU, the GPU executes with thread level granularity. Hence each thread is dependent on the data and instruction set the instruction processing pipeline. All threads within a streaming multiprocessor (SM) block are synchronized by the synchronizing barrier. The GPU wastes a certain amount of clock to synchronize all the swarm of threads. The entire threads execution constitutes a layer execution. Hence there is wastage of time in synchronizing all the threads for layer execution and the next layer cannot be executed unless an output for the current layer is available.

In yet another aspect, the AI system lane according to the present disclosure is configured to receive the CNN in its original format to execute the CNN algorithms. In contrast conventional AI architectures employing a GPU using a general matrix-to-matrix multiplication (GEMM) based algorithm to execute the CNN algorithm. Accordingly, conversion of the input layer into the GEMM format to execute on a GPU decreases the cache misses. Conversion increases size of the input and intermediate to output to be saved because the GEMM algorithm involves duplication of data. Conversion of the output from each layer to a GEMM input format to run on a GPU also increases the effort.

In yet another aspect, the AI system lane according to the present disclosure is configured such that all the weights, bias, and inputs are written to a predetermined address. Hence the AI system virtual lane orchestrator according to the present disclosure will know the address of the memory transaction and there will be no cache misses that are encountered in conventional AI architectures. Accordingly, the present AI system lane technique simplifies fitting multiple AI solution models into the AI system hardware according to the present disclosure. In contrast, in conventional AI architectures trying to fit multiple AI solution models in a GPU will cause inherent competition for fetching the data from the global and local memory by the hardware running two different models. Hence will increase the inefficiency.

In yet another aspect, the AI system lane according to the present disclosure is configured such that as the number of AI system lanes increases the latency for executing a layer decreases since each lane will execute a smaller number of filters. In contrast, in a conventional GPU based AI architecture the GPU is efficient if not scheduling a large amount of threads hence the scaling is not linear.

In yet another aspect, a conventional GPU based AI architecture is configured to hide memory latency by running many threads at the same time. In GPU, each core can run a limited amount of threads per core (in the case of the 1080TI, 32 threads/1024 threads can be scheduled per core). All other threads wait to be scheduled, which hinders real time operation and requires a lot of overhead to schedule the execution of a thread and memory management. In contrast, according to the AI system lane according to the present disclosure, the number of threads/work scheduled is executed in a concurrent and pipelined manner. Hence all the threads/work is scheduled to finish in real time. Since there is no hardware overhead, saving all unexecuted threads is more energy efficient and faster.

In yet another aspect, in a conventional AI architecture, after the execution of thread, depending on the dependency of the output of the thread, the output data may be moved from all the way from local cache to global memory. Hence there will be lot of back and forth of the output data from global memory to local memory and vice-versa. In contrast, since during the depth accumulation in the AI system lane according to the present disclosure, the output data is always available locally and there is no back and forth between the local and global memory for different depth transitions.

In yet another aspect, the AI system lane according to the present disclosure is configured to achieve ultra-high performance through the implementation of multiple lanes, multiple inter-filter parallelism, multiple intra filter parallelism and so on.

In yet another aspect, the AI system lane according to the present disclosure with the AI processing chain reduces data movement overhead to almost zero and hence can achieve ultra-high performance and reduced power. In contrast, in a GPU based AI architecture where static power consumption is extremely high, the AI system lanes according to the present disclosure are active on a need basis to drastically reduce static power.

Figure 16:
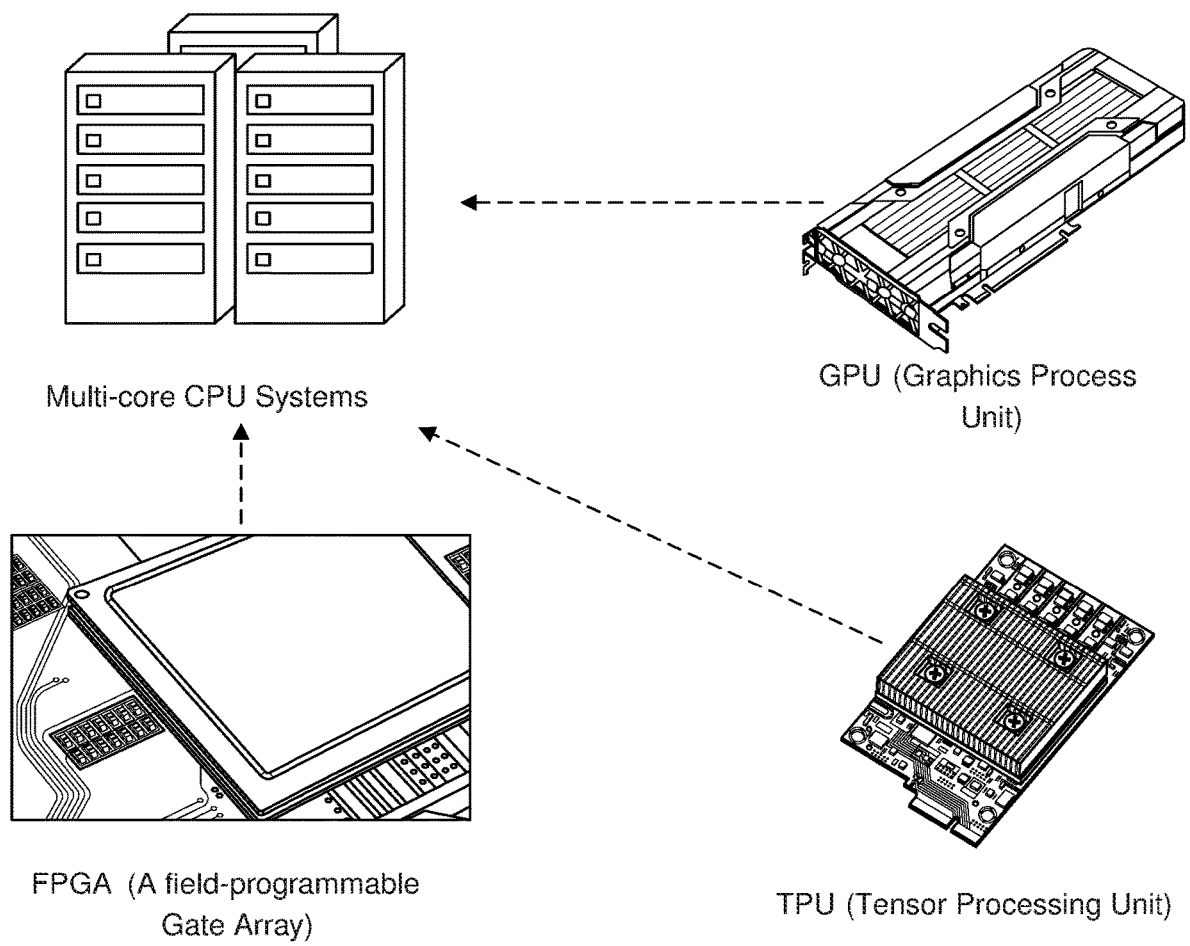
FIG. 16 is a diagram of an AI solution model processing that requires heavy duty setup of machines encompassing multi-core CPU systems, GPUs/TPUs, FPGAs, resulting in extremely expensive, extremely complex, power consuming, time consuming for a given AI solution model training.

In a comparison to existing practices, FIG. 16 is a diagram of an AI solution model processing that requires heavy duty setup of machines encompassing multi-core CPU systems, GPUs/TPUs, FPGAs, resulting in extremely expensive, extremely complex, power consuming, time consuming for a given AI solution model training. Accordingly, the AI architectures shown in FIG. 16 are not real-time and continuous in nature for training. The source of FIG. 16 is http://on-demand.gputechconf.com/gtc/2017/presentation/s7216-uday-kurkure-machine-learning-on-vmware-vsphere.pdf.

Figure 17:
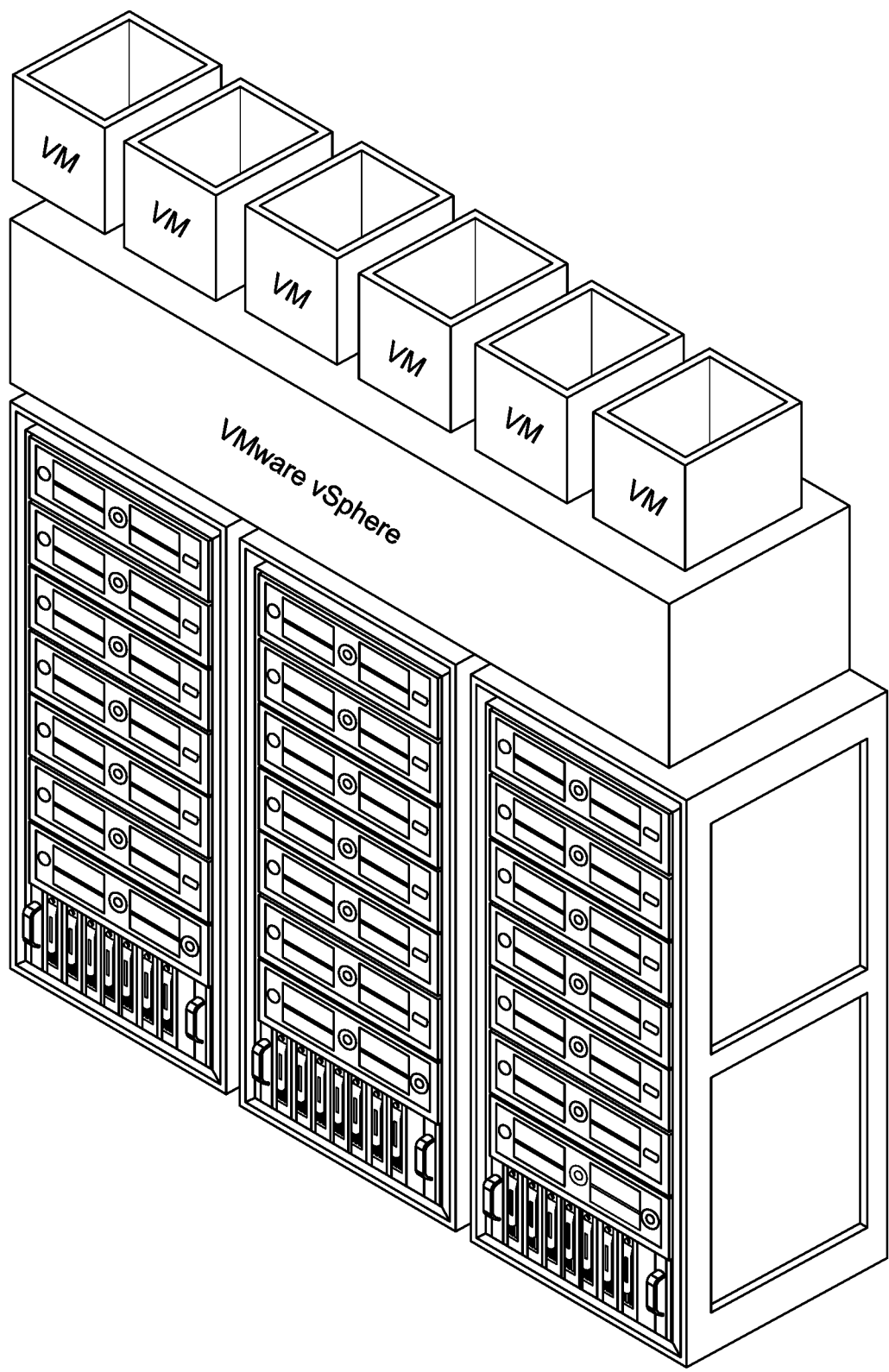
FIG. 17 is a diagram of a traditional virtualized environment VM with guest spread across one or more processor which in turn drives one or more GPUs.

FIG. 17 is a diagram of a traditional virtualized environment VM with guest spread across one or more processor which in turn drives one or more GPUs. The concept of virtualization is driven by hypervisor (VMWare vSphere), as shown in FIG. 17, where the AI framework loads are spread across VMs along with support for multiple GPUs. The source of FIG. 17 is http://on-demand.gputechconf.com/gtc/2017/presentation/s7216-uday-kurkure-machine-learning-on-vmware-vsphere.pdf.

Figure 18:
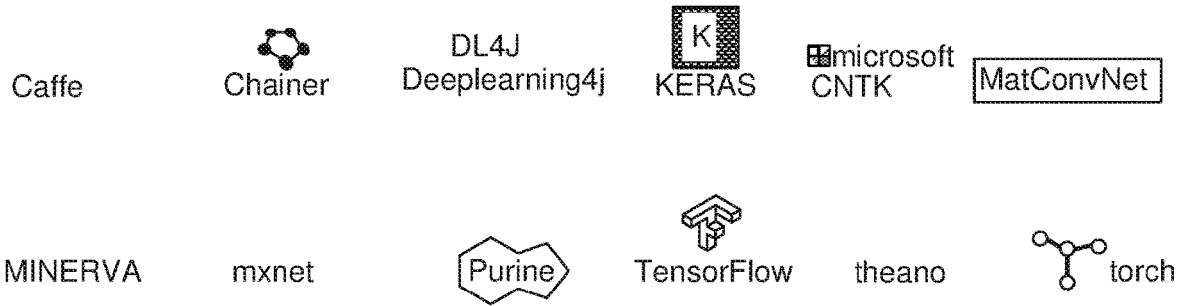
FIG. 18 is a listing of AI software (SW) frameworks that execute on the VM machines shown in FIGS. 16 and 17 along with GPU/TPU acceleration

FIG. 18 is a listing of AI software (SW) frameworks that execute on the VM machines shown in FIGS. 16 and 17 along with GPU/TPU acceleration. The source of FIG. 18 is http://on-demand.gputechconf.com/gtc/2017/presentation/s7216-uday-kurkure-machine-learning-on-vmware-vsphere.pdf.

Figure 19:
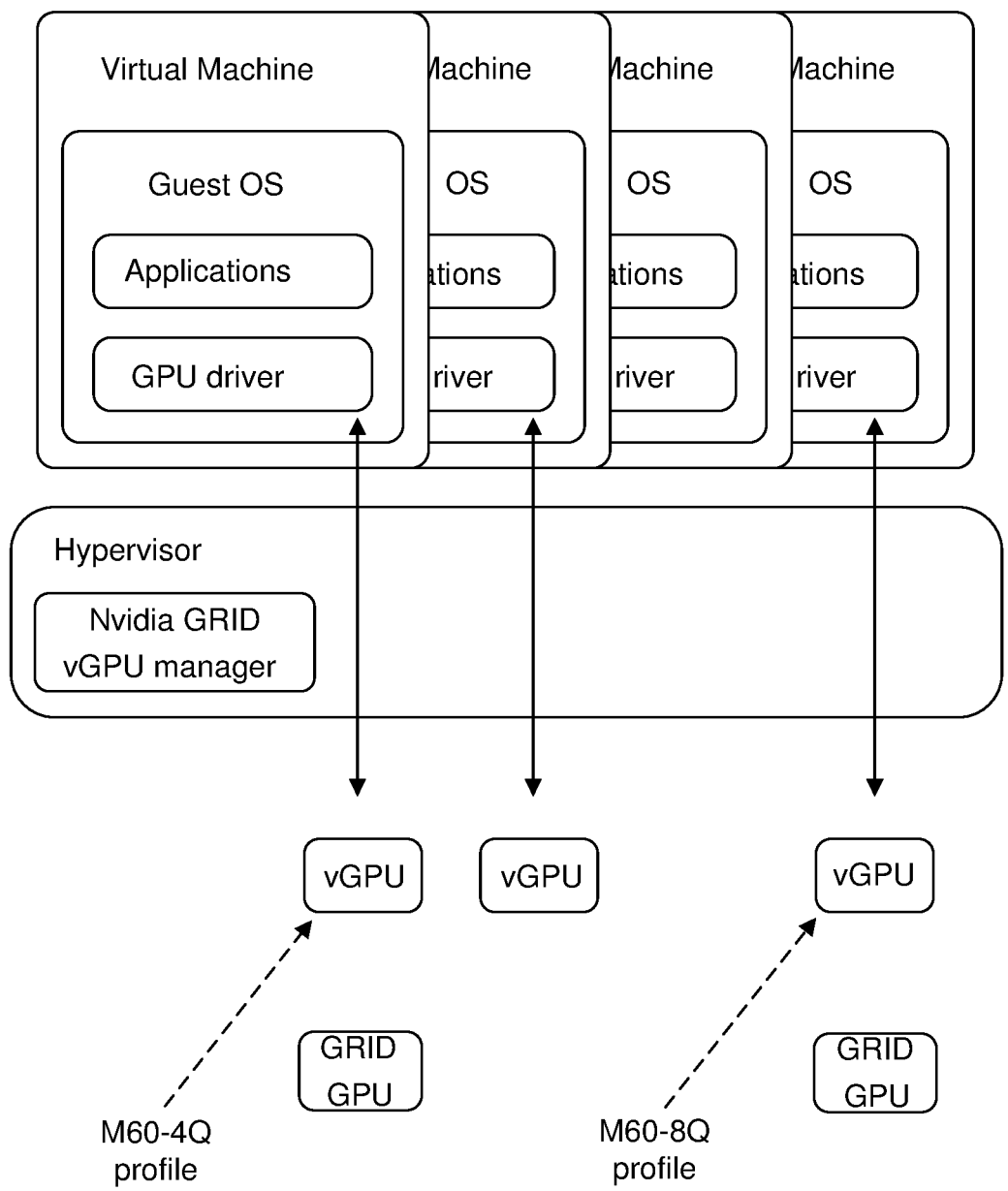
FIG. 19 is a diagram of an AI training model split across a full stack AI SW framework running on multiple VMs with multi processors and multiple GPUs with vGPUs/TPUs as accelerators.

FIG. 19 is a diagram of an AI training model split across a full stack AI SW framework running on multiple VMs with multi processors and multiple GPUs with vGPUs/TPUs as accelerators. The AI training model shown in FIG. 19, requires extensive hardware such as PCI path to/from CPU where AI framework running and GPU and software thread overhead, data copy and duplication, data preparation and pre-processing, mapping and transfer overhead at every stage of full stack processing including between CPU and GPU/TPU at every iteration of a model training. In the AI system lane according to the present disclosure, the processing overhead shown in FIG. 19 does not include a software stack driven model processing engine and does not incur software and processor overhead along the processing path during the model training. The source of FIG. 19 is http://on-demand.gputechconf.com/gtc/2017/presentation/s7216-uday-kurkure-machine-learning-on-vmware-vsphere.pdf.

Figure 20:
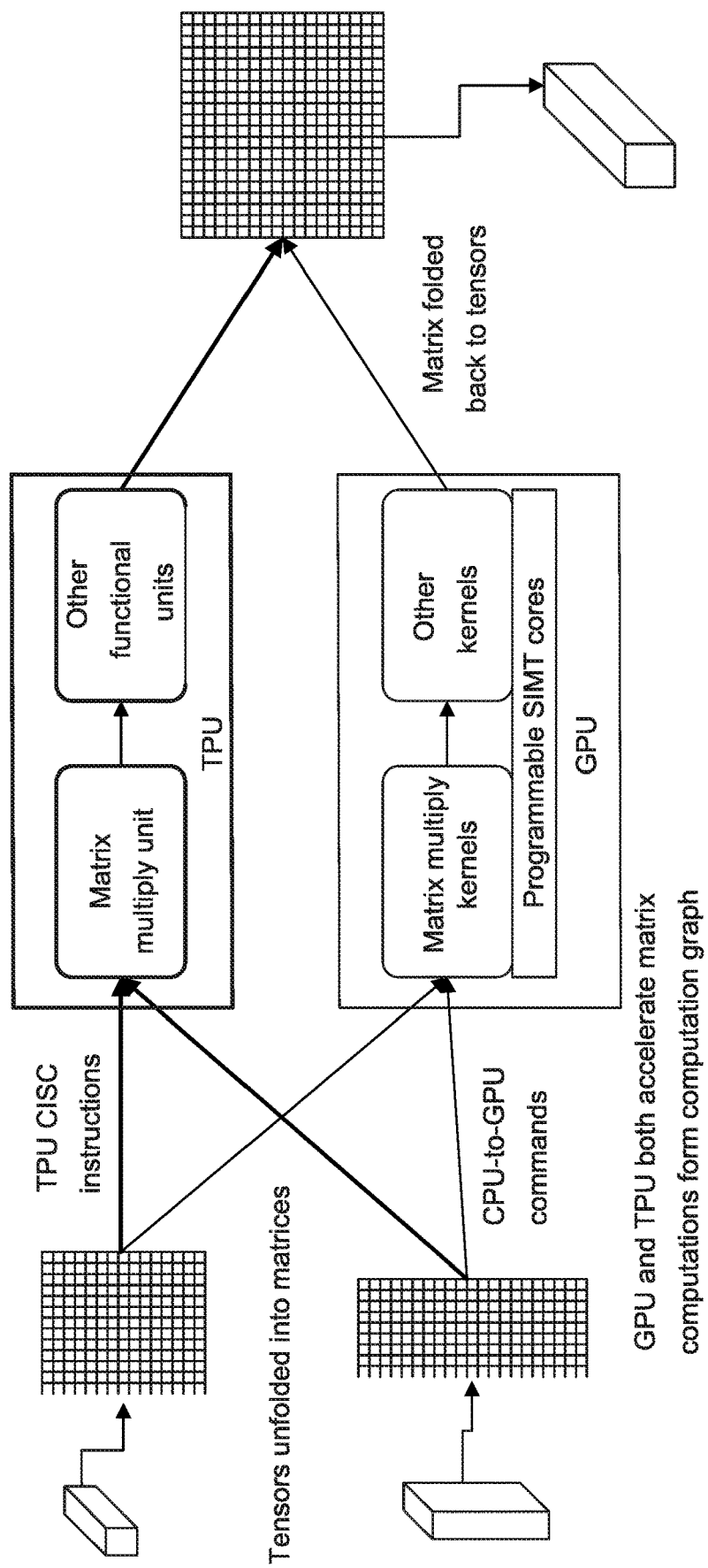
FIG. 20 is a diagram illustrating the role of a GPU and TPU during AI solution model inference and training.

FIG. 20 is a diagram illustrating the role of a GPU and TPU during AI solution model inference and training. Most of the pre-processing and other logic processing related to AI solution model processing is done within the AI SW Framework running on VM/CPU systems. The GPU and the TPU are used to offload matrix computation acceleration for AI solution model inference and training. The source of FIG. 20 is https://medium.com/@CPLu/should-we-all-embrace-systolic-array-df3830f193dc.

Figure 21:
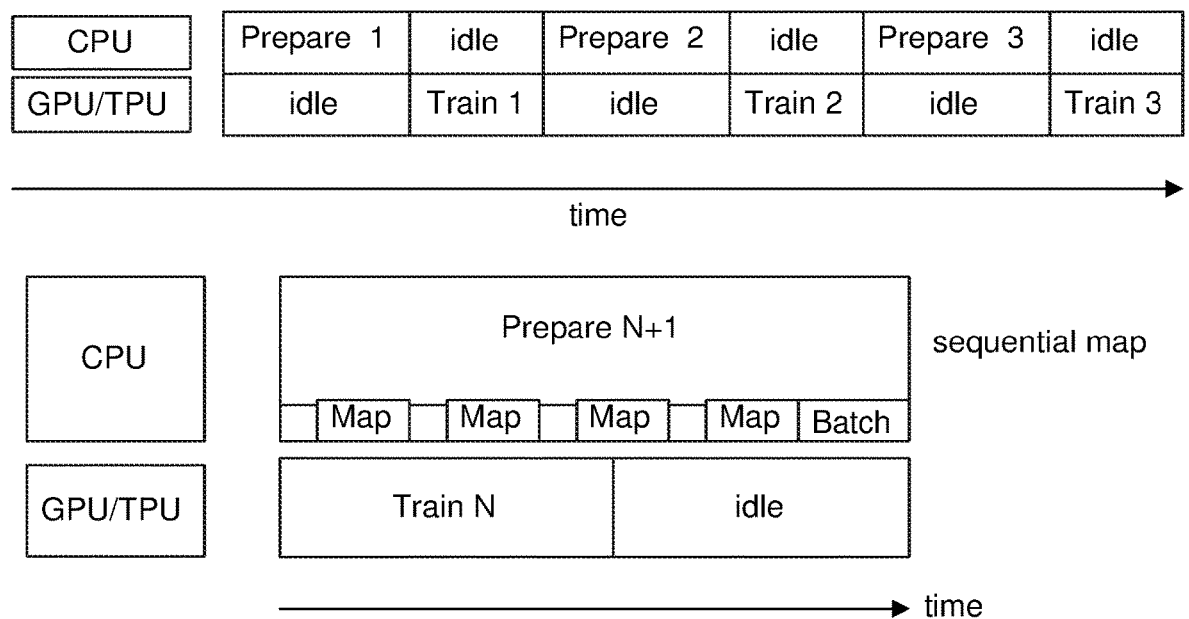
FIG. 21 is a diagram showing that during a CPU and GPU interaction, the CPU and the GPU are idle much of the time.

FIG. 21 is a diagram showing that during a CPU and GPU interaction, the CPU and the GPU are idle much of the time. To perform a training step, the training data must first be extracted and transformed and then fed to an AI solution model running on an accelerator. However, in a naive synchronous implementation, while the CPU is preparing the data, the accelerator is idle. Conversely, while the accelerator is training the model, the CPU is idle. The training step time is thus the sum of both CPU pre-processing time and the accelerator training time.

Pipelining overlaps the preprocessing and model execution of a training step. While the accelerator is performing training step N, the CPU is preparing the data for step N+1. Doing so reduces the step time to the maximum (as opposed to the sum) of the training and the time it takes to extract and transform the data. The source of FIG. 21 is https://www.tensorflow.org/performance/datasets_performance#map_and_batch.

Figure 22:
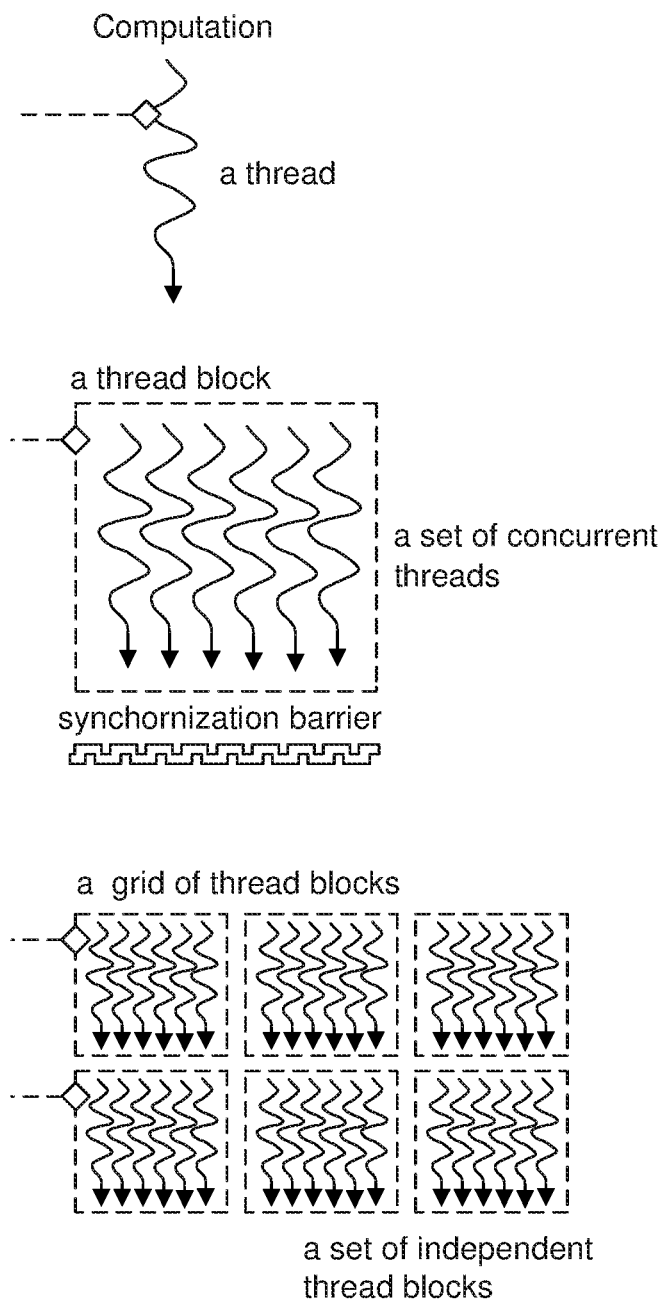
FIG. 22 is a diagram illustrating considerable delays and bottlenecks in processing any logic within the GPU itself in terms of a computing matrix multiply operation using multiple threads where each thread is running a CUDA core.

FIG. 22 is a diagram illustrating considerable delays and bottlenecks in processing any logic within the GPU itself in terms of a computing matrix multiply operation using multiple threads where each thread is running a CUDA core. As shown in FIG. 22, within the GPU itself there are considerable delays and bottlenecks in processing any logic in terms of a computing matrix multiply operation using multiple threads where each thread running a CUDA core, waiting for thread scheduling with few threads scheduled at a time, and memory is shared across threads.

In yet another aspect, in contrast with the conventional architectures described above, the AI system lane according to the present disclosure provides improvements over a conventional systolic array approach. Problems and limitations with a systolic array includes overhead to load the weights worsens in two dimensions, input bandwidth requirement increases with square of the side length of the array, layers with shallow feature depths performance is poor, and the shallowness of feature depths is relative to the side length of the systolic array.

GPUs are designed for graphic applications and retrofitted to AI applications. For instance, GPUs do not perform well on live data coming across computer network (end-to-end latency is high).

Graphcore and similar companies using hyper-multi-core general reduced instruction set/complex instruction set (RISC/CISC) processors for training. Most new companies have lower bandwidth between their accelerator and memory with only 64-bit interfaces. The claims made by these companies of Teraops (Tera operations per second) or Teraflops (Tera floating point operations per second) do not translate into real performance. The AI system lane according to the present disclosure is beyond 512 bit interface (512 bit, 1024 bit, even 2048 bit in future). The hardware architecture of the AI system lane according to the present disclosure supports an interface beyond 512 bits and when such high bandwidth memories become practical to fabricate, they can be employed in the hardware architecture of the AI system lane. In contrast, the performance of the AI system lane according to the present disclosure is not measured in Teraops or Teraflops, which has no practical relevance. Rather, the performance of the AI system lane according to the present disclosure may be measured in terms of samples/sec such as, for example, images/sec for video/image processing.

A GPU in conventional AI architectures needs to be driven by VMs, GPU manager, drivers, and an AI framework all running on CPU. The GPU uses a GEMM based algorithm to accelerate inference execution. This increases the setup time and random access memory (RAM) size to hold the image to column data.

In various aspects, the AI system lane architecture according to the present disclosure provides various advantages over the conventional GPU based AI architecture. Some of these advantages include, for example, less RAM usage, no setup time for each layer execution, can be used for real time inference (since no setup time), all the lanes finish almost at the same time hence there inference hardware is always busy, hence it is very energy efficient, and CNN, MaxPool and FC run in parallel, less execution time.

Key GPU terminologies include thread, block, grid, kernel, and stream. A thread refers to a single basic operation like string comparison. A block refers to an array of threads running in parallel. Threads are grouped or sub-divided into blocks. A grid refers to blocks grouped into a grid. A grid can be 2D or 3D. A kernel refers to a function executed on the GPU as a grid of blocks of threads. A stream refers to a single operation sequence on a GPU device. Each CUDA kernel can be invoked on an independent stream concurrently.

The description now turns a comparison of a conventional GPU based AI architecture model overhead processing using the above versus no such overhead using the AI system lane according to one aspect of the present disclosure. A GPU hides the memory latency by running many threads at the same time. In a GPU, each core can run a limited number of threads per core (in the 1080TI case, 32 threads/1024 threads can be scheduled per core). All other threads wait to be scheduled which hinder real time operation and also a lot of overhead to schedule the execution of thread, memory management. See, e.g., https://streamhpc.com/blog/2017-01-24/many-threads-can-run-gpu/. In contrast, in accordance with the AI system lane systems and methods described herein, the number of threads/work scheduled includes all threads/work executed in a concurrency and pipelined manner. Hence all the threads/work is scheduled will finish in real time. Since there is no overhead hardware, saving all the unexecuted threads is more energy efficient and faster than the conventional GPU based AI solution model overhead processing techniques. Further, real time continuous online AI solution model training is impossible or extremely difficult to implement with a threading architecture with extreme power and hardware requirement.

The memory hierarchy in a conventional GPU AI architecture is global memory, L2 cache, L1 cache and shared memory. For the data to copy between global memory to L2 cache it takes 500-600 clock cycles. Accordingly, it takes a lot of time for data to flow from the global memory to each memory banks handles by the cores.

In a conventional GPU AI architecture, there is limited shared memory between the blocks. So a large amount of threads can use a limited shared memory. Image data is the shared data in inference.

In a conventional GPU AI architecture, since a large amount of threads are scheduled and wait in the pipeline to be executed, a lot of energy and hardware is used to just to save the executed threads.

In a conventional GPU AI architecture, after the execution of a thread, depending on the dependency of the output of the thread, the output data may be moved from the local cache to the global memory. Hence there will be lot of back-and-forth of the output data from global memory to local memory and vice-versa. Since during the depth accumulation in the AI system lane according to the present disclosure, the output data is always available locally and there is no back-and-forth between the local and the global memory for different depth transition etc. See e.g., https://medium.com/@smallfishbigsea/basic-concepts-in-gpu-computing-3388710e9239.

The AI system lane according to the present disclosure, as the number of lanes increases the latency for executing a layer decreases since each lane will execute a fewer number of filters. In a conventional GPU based AI architecture, this t is not the case. A GPU is efficient only when scheduling a large number of threads. Hence the scaling is not linear.

The description now turns to a comparison of FC overhead processing using a conventional GPU based AI architecture versus the AI system lane systems and methods according to the present disclosure where there is no such overhead. In a memory bound architecture, the faster/wider the interface, the faster the completion of a task. Almost wire-speed consumption of incoming weights. For every training iteration there is an overhead penalty for a forward CNN to forward FC handoff, forward FC to post FC, post FC to backward propagation FC, backward propagation FC to CNN backward propagation, intermediate data copy, duplicate and transfer overhead from AI software, framework/CPU plane to GPU plane and vice-versa.

The foregoing detailed description has set forth various forms of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, and/or examples can be implemented, individually and/or collectively, by a wide range of hardware, software, firmware, or virtually any combination thereof. Those skilled in the art will recognize that some aspects of the forms disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skilled in the art in light of this disclosure. In addition, those skilled in the art will appreciate that the mechanisms of the subject matter described herein are capable of being distributed as one or more program products in a variety of forms and that an illustrative form of the subject matter described herein applies regardless of the particular type of signal-bearing medium used to actually carry out the distribution.

Instructions used to program logic to perform various disclosed aspects can be stored within a memory in the system, such as DRAM, cache, flash memory, or other storage. Furthermore, the instructions can be distributed via a network or by way of other computer-readable media. Thus a machine-readable medium may include any mechanism for storing or transmitting information in a form readable by a machine (e.g., a computer), but is not limited to, floppy diskettes, optical disks, CD-ROMs, magneto-optical disks, ROM, RAM, EPROM, EEPROM, magnetic or optical cards, flash memory, or tangible, machine-readable storage used in the transmission of information over the Internet via electrical, optical, acoustical, or other forms of propagated signals (e.g., carrier waves, infrared signals, digital signals). Accordingly, the non-transitory computer-readable medium includes any type of tangible machine-readable medium suitable for storing or transmitting electronic instructions or information in a form readable by a machine (e.g., a computer).

As used in any aspect herein, the term "control circuit" may refer to, for example, hardwired circuitry, programmable circuitry (e.g., a computer processor comprising one or more individual instruction processing cores, processing unit, processor, microcontroller, microcontroller unit, controller, DSP, PLD, programmable logic array (PLA), or FPGA), state machine circuitry, firmware that stores instructions executed by programmable circuitry, and any combination thereof. The control circuit may, collectively or individually, be embodied as circuitry that forms part of a larger system, for example, an integrated circuit, an application-specific integrated circuit (ASIC), a system on-chip (SoC), desktop computers, laptop computers, tablet computers, servers, smart phones, etc. Accordingly, as used herein, "control circuit" includes, but is not limited to, electrical circuitry having at least one discrete electrical circuit, electrical circuitry having at least one integrated circuit, electrical circuitry having at least one application-specific integrated circuit, electrical circuitry forming a general-purpose computing device configured by a computer program (e.g., a general-purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

As used in any aspect herein, the term "logic" may refer to an app, software, firmware, and/or circuitry configured to perform any of the aforementioned operations. Software may be embodied as a software package, code, instructions, instruction sets, and/or data recorded on non-transitory computer-readable storage medium. Firmware may be embodied as code, instructions, instruction sets, and/or data that are hard-coded (e.g., non-volatile) in memory devices.

As used in any aspect herein, the terms "component," "system," "module," and the like can refer to a computer-related entity, either hardware, a combination of hardware and software, software, or software in execution.

As used in any aspect herein, an "algorithm" refers to a self-consistent sequence of steps leading to a desired result, where a "step" refers to a manipulation of physical quantities and/or logic states which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities and/or states.

A network may include a packet-switched network. The communication devices may be capable of communicating with each other using a selected packet-switched network communications protocol. One example communications protocol may include an Ethernet communications protocol which may be capable permitting communication using a Transmission Control Protocol/IP. The Ethernet protocol may comply or be compatible with the Ethernet standard published by the Institute of Electrical and Electronics Engineers (IEEE) titled "IEEE 802.3 Standard," published in December 2008 and/or later versions of this standard. Alternatively or additionally, the communication devices may be capable of communicating with each other using an X.25 communications protocol. The X.25 communications protocol may comply or be compatible with a standard promulgated by the International Telecommunication Union-Telecommunication Standardization Sector (ITU-T). Alternatively or additionally, the communication devices may be capable of communicating with each other using a frame relay communications protocol. The frame relay communications protocol may comply or be compatible with a standard promulgated by Consultative Committee for International Telegraph and Telephone (CCITT) and/or the American National Standards Institute (ANSI). Alternatively or additionally, the transceivers may be capable of communicating with each other using an Asynchronous Transfer Mode (ATM) communications protocol. The ATM communications protocol may comply or be compatible with an ATM standard published by the ATM Forum, titled "ATM-MPLS Network Interworking 2.0," published August 2001, and/or later versions of this standard. Of course, different and/or after-developed connection-oriented network communication protocols are equally contemplated herein.

Unless specifically stated otherwise as apparent from the foregoing disclosure, it is appreciated that, throughout the foregoing disclosure, discussions using terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

One or more components may be referred to herein as "configured to," "configurable to," "operable/operative to," "adapted/adaptable," "able to," "conformable/conformed to," etc. Those skilled in the art will recognize that "configured to" can generally encompass active-state components, inactive-state components, and/or standby-state components, unless context requires otherwise.

Those skilled in the art will recognize that, in general, terms used herein, and especially in the appended claims (e.g., bodies of the appended claims), are generally intended as "open" terms (e.g., the term "including" should be interpreted as "including, but not limited to"; the term "having" should be interpreted as "having at least"; the term "includes" should be interpreted as "includes, but is not limited to"). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations or two or more recitations). Furthermore, in those instances where a convention analogous to "at least one of A, B, and C, etc." is used, in general, such a construction is intended in the sense that one having skill in the art would understand the convention (e.g., "a system having at least one of A, B, and C" would include, but not be limited to, systems that have A alone, B alone, C alone, A and B together, A and C together, B and C together, and/or A, B, and C together). In those instances where a convention analogous to "at least one of A, B, or C, etc." is used, in general, such a construction is intended in the sense that one having skill in the art would understand the convention (e.g., "a system having at least one of A, B, or C" would include, but not be limited to, systems that have A alone, B alone, C alone, A and B together, A and C together, B and C together, and/or A, B, and C together). It will be further understood by those within the art that typically a disjunctive word and/or phrase presenting two or more alternative terms, whether in the description, claims, or drawings, should be understood to contemplate the possibilities of including one of the terms, either of the terms, or both terms, unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures, or characteristics may be combined in any suitable manner in one or more aspects.

Any patent application, patent, non-patent publication, or other disclosure material referred to in this specification and/or listed in any Application Data Sheet is incorporated by reference herein, to the extent that the incorporated materials are not inconsistent herewith. As such, and to the extent necessary, the disclosure as explicitly set forth herein supersedes any conflicting material incorporated herein by reference. Any material, or portion thereof, that is said to be incorporated by reference herein but which conflicts with existing definitions, statements, or other disclosure material set forth herein will only be incorporated to the extent that no conflict arises between that incorporated material and the existing disclosure material.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

EXAMPLES

Various aspects of the subject matter described herein are set out in the following numbered examples:

Example 1. An artificial intelligence (AI) system lane, comprising: an AI system lane processing chain; at least one AI processing block; a local memory; a hardware sequencer; and a lane composer; wherein each of the at least one AI processing block, the local memory coupled to the AI system lane processing chain, the hardware sequencer coupled to the AI system lane processing chain, and the lane composer is coupled to the AI system lane processing chain; and wherein the AI system lane processing chain is dynamically created by the lane composer.

Example 2. The AI system lane of Example 1, wherein the AI system lane processing chain is dynamically configured by the lane composer in a forward propagation chain to execute an AI solution model inference.

Example 3. The AI system lane of Example 1 or 2, wherein the AI system lane processing chain is dynamically configured by the lane composer in a backward propagation chain to execute an AI solution model training.

Example 4. The AI system lane of any one of Examples 1 to 3, wherein the AI system lane processing chain is dynamically configured by the lane composer in a forward propagation chain and a backward propagation chain to execute AI solution model inference and AI solution model training.

Example 5. The AI system lane of any one of Examples 1 to 4, further comprising a lane maintainer coupled to the lane composer, wherein the lane composer and the lane maintainer are configured to dynamically update and destroy lanes with a lane hardware framework module through dynamic expansion or contraction of the AI system lane processing chain and parametrization.

Example 6. The AI system lane of any one of Examples 1 to 5, further comprising an AI processing hardware orchestrator coupled to the hardware sequencer, wherein the AI processing hardware orchestrator is configured to dynamically trigger the AI system lane composer to enable and trigger the hardware sequencer to execute the AI system lane processing chain in a real-time and continuous manner.

Example 7. The AI system lane of any one of Examples 1 to 6, wherein the AI processing block comprises at least one of a convolutional neural network (CNN), a fully connected (FC) neural network, a long short term memory (LSTM), a recurrent neural network (RNN), a MaxPool, a AvgPool, a normalization, an activation, a SoftMax, a sorting, a classification, a decision, a rules based decisions, and/or a geo mapping foundational blocks/engines/elements, or any combination thereof.

Example 8. The AI system lane of any one of Example 1 to 7, wherein the AI processing block comprises at least one or more AI processing functions based on user inputs.

Example 9. The AI system lane of any one of Examples 1 to 8, further comprising a security policy engine coupled to the AI system lane processing chain.

Example 10. The AI system lane of Example 9, wherein the security policy engine comprises at least one security programmable logic unit (S-PLU) configured to: process security related features; provide security to the AI system lane; and enable a range of AI driven security applications.

Example 11. The AI system lane of any of Examples 1 to 10, further comprising at least one adaptive intelligent processing logic unit (ADI-PLU) coupled to the AI system lane processing chain.

Example 12. An artificial intelligence (AI) system multilane parallel hardware AI processor, comprising multiple lanes as defined in any one of Examples 1 toll, wherein the multiple lanes are configured in a parallel and pipelined manner.

Example 13. A virtual artificial intelligence (AI) system multilane, comprising: a virtual AI system multilane processing chain; at least two AI system lanes; a local memory; an AI processing hardware orchestrator; and a virtual lane maintainer; a virtual lane composer; wherein the virtual AI system multilane processing chain, the at least one AI system lane, the local memory, the AI processing hardware orchestrator, the virtual lane maintainer, and the virtual lane composer are coupled to the virtual AI system multilane processing chain; wherein an AI solution model calculation is mapped to the at least two AI system lanes; and wherein each element of the virtual AI system multilane processing chain is configured via a virtual lane maintainer and the virtual lane composer.

Example 14. The virtual AI system of claim of Example 13, wherein the virtual lane composer is configured to execute an AI solution model fine grain processing behavior and structure of convolutional neural network (CNN) engine and a fully connected (FC) neural network engine.

Example 15. The virtual AI system of claim Example 13 or 14, wherein the AI processing hardware orchestrator is configured to dynamically trigger the virtual lane composer to enable and trigger a hardware sequencer to execute the virtual AI system multilane processing chain in a real-time and continuous manner.

Example 16. The virtual AI system of claim of any one of Examples 13 to 15, further comprising an uber orchestrator coupled to the AI processing hardware orchestrator, wherein the uber orchestrator is configured to trigger the AI processing hardware orchestrator of at least one of the at least two AI system lanes that participate in executing an AI solution model.

Example 17. The virtual AI system of claim of any one of Examples 13 to 16, wherein the AI processing hardware orchestrator comprises a hardware execution sequencer to execute the virtual AI system multilane processing chain.

Example 18. The virtual AI system of claim of any one of Examples 13 to 17, further comprising a data fuser configured to concatenate, hyper map or digest results received from different AI system lanes that are aligned in the frequency, time and space domains.

Example 19. The virtual AI system of claim of any one of Examples 13 to 18, further comprising at least one AI processing block; coupled to the virtual AI system multilane processing chain.

Example 20. The virtual AI system of Example 19, wherein the AI processing block comprises at least one of a convolutional neural network (CNN), a fully connected (FC) neural network, a long short term memory (LSTM), a recurrent neural network (RNN), a MaxPool, a AvgPool, a normalization, an activation, a SoftMax, a sorting, a classification, a decision, a rules based decisions, and/or a geo mapping foundational blocks/engines/elements, or any combination thereof.

Example 21. The virtual AI system of Example 19, wherein the AI processing block comprises at least one or more AI processing functions based on user inputs.

Example 22. The virtual AI system of any one of Examples 13 to 21, further comprising a security policy engine coupled to the virtual AI system multilane processing chain.

Example 23. The virtual AI system lane of Example 22, wherein the security policy engine comprises at least one security programmable logic unit (S-PLU) configured to: process security related features; provide security to the AI system lane; and enable a range of AI driven security applications.

Example 24. The virtual AI system lane of any one of Examples 13 to 23, further comprising at least one adaptive intelligent processing logic unit (ADI-PLU) coupled to the AI system lane processing chain.

What is claimed is:

1. An artificial intelligence (AI) system lane, comprising:
   an AI system lane hardware processing chain;
   at least one AI processing block that is a parallel and pipelined AI hardware logic;
   a local memory, wherein the local memory is a memory configured to store the data, layer results, weights, and inputs required by the AI system lane to execute;
   a hardware sequencer to execute the AI system lane hardware processing chain; and
   a lane composer that dynamically composes one or more AI processing blocks;
   wherein the hardware sequencer is coupled to an AI processing hardware orchestrator, the AI processing hardware orchestrator configured to dynamically trigger the lane composer to enable and trigger the hardware sequencer to execute the AI system lane processing chain in a real-time and continuous manner;
   wherein the lane composer is coupled to a lane maintainer, the lane composer and the lane maintainer configured to dynamically update and destroy the AI system lanes with a lane hardware framework module through dynamic expansion or contraction of the AI system lane processing chain and parametrization;
   wherein each of the at least one AI processing block, the local memory coupled to the AI system lane processing chain, the hardware sequencer coupled to the AI system lane processing chain, and the lane composer is coupled to the AI system lane processing chain; and
   wherein the AI system lane processing chain is dynamically created by the lane composer, wherein the AI system lane is configured to execute an AI application solution including inferencing and/or training.

2. The AI system lane of claim 1, wherein the AI system lane processing chain is dynamically configured by the lane composer in a forward propagation chain to execute an AI solution model inference.

3. The AI system lane of claim 1, wherein the AI system lane processing chain is dynamically configured by the lane composer in a backward propagation chain to execute an AI solution model training.

4. The AI system lane of claim 1, wherein the AI system lane processing chain is dynamically configured by the lane composer in a forward propagation chain and a backward propagation chain to execute AI solution model inference and AI solution model training.

5. The AI system lane of claim 1, wherein the AI processing block comprises at least one of a convolutional neural network (CNN), a fully connected (FC) neural network, a long short term memory (LSTM), a recurrent neural network (RNN), a MaxPool, a AvgPool, a normalization, an activation, a SoftMax, a sorting, a classification, a decision, a rules based decisions, and/or a geo mapping foundational blocks/engines/elements, or any combination thereof.

6. The AI system lane of claim 1, wherein the AI processing block comprises at least one or more AI processing functions based on user inputs.

7. The AI system lane of claim 1, further comprising a security policy engine coupled to the AI system lane processing chain.

8. The AI system lane of claim 7, wherein the security policy engine comprises at least one security programmable logic unit (S-PLU) configured to:
process security related features:
provide security to the AI system lane; and
enable a range of AI driven security applications.

9. The AI system lane of claim 1, further comprising at least one adaptive intelligent processing logic unit (ADI-PLU) coupled to the Al system lane processing chain.

10. An artificial intelligence (AI) system multilane parallel hardware Al processor, comprising a plurality of lanes, wherein each of lane of the plurality of lanes comprises:
an AI system lane hardware processing chain;
at least one AI processing block that is a parallel and pipelined AI hardware logic;
a local memory;
a hardware sequencer to execute the AI system lane hardware processing chain; and
a lane composer that dynamically composes one or more AI processing blocks:
wherein each of the at least one AI processing block, the local memory coupled to the Al system lane processing chain, the hardware sequencer coupled to the AI system lane processing chain, and the lane composer is coupled to the AI system lane processing chain; and
wherein the AI system lane processing chain is dynamically created by the lane composer;
wherein the plurality of lanes are configured in a parallel and pipelined manner.

11. A virtual artificial intelligence (AI) system multilane, comprising:
a virtual AI system multilane hardware processing chain;
at least two AI system lanes;
a local memory;
an AI processing hardware orchestrator that triggers virtual lane maintainer and virtual lane composer; and
a virtual lane maintainer that maintains the virtual AI system multilane;
a virtual lane composer that dynamically composes two or more AI system lanes;
wherein the virtual AI system multilane processing chain, the at least one AI system lane, the local memory, the AI processing hardware orchestrator, the virtual lane maintainer, and the virtual lane composer are coupled to the virtual AI system multilane processing chain;
wherein an AI solution model calculation is mapped to the at least two AI system lanes;
and
wherein each element of the virtual AI system multilane processing chain is configured via a virtual lane maintainer and the virtual lane composer.

12. The virtual AI system of claim of claim 11, wherein the virtual lane composer is configured to execute an AI solution model fine grain processing behavior and structure of convolutional neural network (CNN) engine and a fully connected (FC) neural network engine.

13. The virtual AI system of claim of claim 11, wherein the AI processing hardware orchestrator is configured to dynamically trigger the virtual lane composer to enable and trigger a hardware sequencer to execute the virtual AI system multilane processing chain in a real-time and continuous manner.

14. The virtual AI system of claim of claim 11, further comprising an uber orchestrator coupled to the AI processing hardware orchestrator, wherein the uber orchestrator is configured to trigger the AI processing hardware orchestrator of at least one of the at least two Al system lanes that participate in executing an Al solution model.

15. The virtual AI system of claim of claim 11, wherein the AI processing hardware orchestrator comprises a hardware execution sequencer to execute the virtual AI system multilane processing chain.

16. The virtual AI system of claim of claim 11, further comprising a data fuser configured to concatenate, hyper map or digest results received from different AI system lanes that are aligned in the frequency, time and space domains.

17. The virtual AI system of claim of claim 11, further comprising at least one AI processing block: coupled to the virtual AI system multilane processing chain.

18. The virtual AI system of claim 17, wherein the AI processing block comprises at least one of a convolutional neural network (CNN), a fully connected (FC) neural network, a long short term memory (LSTM), a recurrent neural network (RNN), a MaxPool, a AvgPool, a normalization, an activation, a SoftMax, a sorting, a classification, a decision, a rules based decisions, and/or a geo mapping foundational blocks/engines/elements, or any combination thereof.

* * * * *